(12) United States Patent
 Takata

(10) Patent No.: US 11,876,425 B2
(45) Date of Patent: Jan. 16, 2024

(54) VIBRATOR SUPPORT STRUCTURE, VIBRATION MOTOR, AND ELECTRONIC DEVICE

(71) Applicant: Murata Manufacturing Co., Ltd., Nagaokakyo (JP)

(72) Inventor: Kazuhide Takata, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 377 days.

(21) Appl. No.: 17/389,888

(22) Filed: Jul. 30, 2021

(65) Prior Publication Data

US 2021/0359582 A1 Nov. 18, 2021

Related U.S. Application Data

(63) Continuation of application No. PCT/JP2020/002522, filed on Jan. 24, 2020.

(30) Foreign Application Priority Data

Feb. 5, 2019 (JP) .................................. 2019-019209

(51) Int. Cl.
 *H02K 33/02* (2006.01)
(52) U.S. Cl.
 CPC .................................. *H02K 33/02* (2013.01)
(58) Field of Classification Search
 CPC .............................. H02K 33/02; H02K 33/16
 USPC ........................................ 310/24, 25, 26, 29
 See application file for complete search history.

(56) References Cited

U.S. PATENT DOCUMENTS

| 10,971,983 | B2* | 4/2021 | Zhu ........................ H02K 33/02 |
| 2012/0313459 | A1 | 12/2012 | Zhang |
| 2016/0226363 | A1 | 8/2016 | Mao et al. |
| 2017/0214306 | A1* | 7/2017 | Katada .................... H02K 33/16 |
| 2017/0288521 | A1* | 10/2017 | Jin ......................... H02K 33/18 |

(Continued)

FOREIGN PATENT DOCUMENTS

| CN | 205212673 U | 5/2016 |
| CN | 107407962 A | 11/2017 |

(Continued)

OTHER PUBLICATIONS

International Search Report issued for PCT/JP2020/002522, dated Feb. 18, 2020.

(Continued)

*Primary Examiner* — Rashad H Johnson
(74) *Attorney, Agent, or Firm* — ArentFox Schiff LLP

(57) ABSTRACT

A vibrator support structure, a vibration motor including the vibrator support structure, and an electronic device including the vibration motor are provided. The vibrator support structure includes a housing, a vibrator, and a first support member. The vibrator is slidable in a first direction D1 and a second direction D2 that crosses the first direction D1. The vibrator is supported within the housing by the first support member, which includes a first deformation portion and a first engagement portion. The first deformation portion undergoes elastic deformation associated with vibrations of the vibrator in the first direction D1. The first engagement portion engages with the vibrator in such a manner that the vibrator produces a sliding motion associated with vibrations of the vibrator in the second direction D2.

20 Claims, 22 Drawing Sheets

(56) References Cited

U.S. PATENT DOCUMENTS

| | | | |
|---|---|---|---|
| 2017/0288523 A1* | 10/2017 | Katada | H02P 25/032 |
| 2018/0021812 A1* | 1/2018 | Akanuma | H02K 33/00 |
| | | | 310/25 |
| 2018/0026511 A1* | 1/2018 | Akanuma | H02K 33/18 |
| | | | 310/20 |
| 2018/0111163 A1* | 4/2018 | Xu | B06B 1/045 |
| 2018/0166961 A1* | 6/2018 | Guo | H02K 33/18 |
| 2018/0188121 A1 | 7/2018 | Ono et al. | |
| 2018/0287476 A1* | 10/2018 | Zu | H02K 33/18 |
| 2018/0297061 A1* | 10/2018 | Mao | H02K 5/04 |
| 2018/0297073 A1* | 10/2018 | Xu | B06B 1/045 |
| 2018/0297075 A1* | 10/2018 | Ling | B06B 1/045 |
| 2018/0297078 A1* | 10/2018 | Xu | B06B 1/045 |
| 2018/0331608 A1* | 11/2018 | Liu | H02K 33/18 |
| 2018/0351442 A1* | 12/2018 | Liu | H02K 33/16 |
| 2018/0351443 A1* | 12/2018 | Liu | H02K 33/14 |
| 2018/0358878 A1* | 12/2018 | Liu | H02K 1/34 |
| 2018/0358879 A1* | 12/2018 | Liu | H02K 1/34 |
| 2018/0358880 A1* | 12/2018 | Liu | H02K 33/18 |
| 2019/0044425 A1* | 2/2019 | Zu | H02K 33/02 |
| 2019/0081543 A1* | 3/2019 | Zhu | H02K 33/02 |
| 2019/0081544 A1* | 3/2019 | Zhu | H02K 33/02 |
| 2019/0151896 A1* | 5/2019 | Takahashi | B06B 1/045 |
| 2019/0207496 A1* | 7/2019 | Takahashi | H02K 33/18 |
| 2019/0207497 A1* | 7/2019 | Mao | B06B 1/045 |
| 2019/0207498 A1* | 7/2019 | Mao | H02K 35/02 |
| 2019/0356208 A1* | 11/2019 | Okayasu | B06B 1/045 |
| 2020/0044526 A1* | 2/2020 | Tang | H02K 33/18 |
| 2020/0044534 A1* | 2/2020 | Tang | H02K 33/18 |
| 2020/0044535 A1* | 2/2020 | Tang | H02K 33/16 |
| 2020/0044545 A1* | 2/2020 | Tang | H02K 33/16 |
| 2020/0044548 A1* | 2/2020 | Tang | H02K 33/18 |
| 2020/0127547 A1* | 4/2020 | Takahashi | H02K 33/18 |
| 2020/0156112 A1* | 5/2020 | Wauke | B06B 1/045 |
| 2020/0366177 A1* | 11/2020 | Maeda | H02K 33/02 |
| 2020/0403533 A1* | 12/2020 | Osawa | H02N 2/0055 |
| 2020/0412225 A1* | 12/2020 | Cui | H02K 33/18 |
| 2020/0412227 A1* | 12/2020 | Mao | H02K 33/18 |
| 2021/0067021 A1* | 3/2021 | Maeda | H02K 33/16 |
| 2021/0091648 A1* | 3/2021 | Jin | H02K 7/065 |
| 2021/0184553 A1* | 6/2021 | Berrezag | H02K 33/12 |
| 2021/0235199 A1* | 7/2021 | Iwakura | H04R 11/02 |
| 2021/0321200 A1* | 10/2021 | Kim | H04R 7/04 |
| 2022/0200427 A1* | 6/2022 | Ma | H02K 33/02 |
| 2022/0255412 A1* | 8/2022 | Wang | H02K 33/16 |
| 2022/0311320 A1* | 9/2022 | Kurita | H02K 33/16 |
| 2023/0198365 A1* | 6/2023 | Hirata | H02K 33/02 |
| | | | 310/15 |

FOREIGN PATENT DOCUMENTS

| | | |
|---|---|---|
| JP | 2015044177 A | 3/2015 |
| JP | 2016127789 A | 7/2016 |
| JP | 2017018958 A | 1/2017 |
| JP | 2017094317 A | 6/2017 |
| JP | 2018137995 A | 8/2018 |
| WO | 2016157264 A1 | 10/2016 |

OTHER PUBLICATIONS

Written Opinion of the International Searching Authority issued for PCT/JP2020/002522, dated Feb. 18, 2020.

* cited by examiner

VIBRATOR SUPPORT STRUCTURE, VIBRATION MOTOR, AND ELECTRONIC DEVICE

CROSS REFERENCE TO RELATED APPLICATIONS

The present application is a continuation of PCT/JP2020/002522 filed Jan. 24, 2020, which claims priority to Japanese Patent Application No. 2019-019209, filed Feb. 5, 2019, the entire contents of each of which are incorporated herein by reference.

TECHNICAL FIELD

The present disclosure relates to a vibrator support structure, a vibration motor including the vibrator support structure, and an electronic device including the vibration motor.

BACKGROUND

Japanese Unexamined Patent Application Publication No. 2017-94317 (hereinafter "Patent Document 1") discloses an example of an existing vibration motor. FIG. 25 is an internal plan view of the vibration motor disclosed in Patent Document 1. The vibration motor 200 includes a housing 201, a vibrator 202, a first coil 203, a second coil 204, and support members S201 to S204.

Moreover, the vibrator 202 includes a first magnet and a second magnet (not illustrated). The first coil 203 is fixed to the housing 201 in a manner so as to face the first magnet. The second coil 204 is fixed to the housing 201 in a manner so as to face the second magnet. Each of the support members S201 to S204 is a spring member that is in the form of a bent plate. The vibrator 202 is supported within the housing 201 by the support members S201 to S204.

The first coil 203 and the first magnet generate driving force that causes the vibrator 202 to vibrate in a first direction D1. The second coil 204 and the second magnet generate driving force that causes the vibrator 202 to vibrate in a second direction D2.

One end of each of the support members S201 to S204 is fixed to the housing 201 in the following manner: one end of the support member S201 and one end of the support member S202 face each other in the second direction D2, and one end of the support member S203 and one end of the support member S204 face each other in the second direction D2. The other end of each of the support members S201 to S204 is fixed to the vibrator 202 in the following manner: the other end of the support member S201 and the other end of the support member S202 face each other in the second direction D2, and the other end of the support member S203 and the other end of the support member S204 face each other in the second direction D2. Vibrations of the vibrator 202 are transmitted to the housing 201 through the support members S201 to S204 and are thus sensed as vibrations of the vibration motor 200.

When the vibrator 202 of the vibration motor 200 vibrates in the first direction D1, shearing stress occurs between the housing 201 and one end of each of the support members S201 to S204. Repeated vibrations in the first direction D1 can cause breakage of a joint between the housing 201 and one end of each of the support members S201 to S204.

SUMMARY OF THE INVENTION

Accordingly, it is an object of the exemplary aspects of the present disclosure to provide a vibrator support structure that reduces stress exerted on a joint between a housing and a support member by which a vibrator vibrating in two different directions is supported within the housing. It is another object of the exemplary aspects of the present disclosure to provide a vibration motor including the vibrator support structure. It is still another object of the exemplary aspects of the present disclosure to provide an electronic device including the vibration motor.

Thus, a vibrator support structure is provided according to the present disclosure that includes a first housing, a vibrator, and at least one first support member. The vibrator is slidable in a first direction and a second direction crossing the first direction. The at least one first support member includes a first deformation portion and a first engagement portion. Moreover, the first deformation portion undergoes elastic deformation associated with vibrations of the vibrator in the first direction. The first engagement portion is in engagement with the vibrator in such a manner that the vibrator is constructed to produce a sliding motion associated with vibrations of the vibrator in the second direction.

Moreover, a vibration motor according to the present disclosure is provided that includes a first housing, a vibrator, a first coil, a second coil, a first repulsion mechanism, and a second repulsion mechanism. The vibrator includes at least one first magnet and at least one second magnet. The first coil is fixed to the first housing to provide driving force to the at least one first magnet in such a manner that the driving force causes the vibrator to vibrate in a first direction. The second coil is fixed to the first housing to provide driving force to the at least one second magnet in such a manner that the driving force causes the vibrator to vibrate in a second direction crossing the first direction. The first repulsion mechanism causes repulsion between the first housing and the vibrator in the first direction and renders the vibrator movable in the second direction. The second repulsion mechanism causes repulsion between the first housing and the vibrator in the second direction and renders the vibrator movable in the first direction.

According to an exemplary aspect, the first repulsion mechanism includes a first support member by which the vibrator is supported within the first housing. Moreover, the first support member includes a first deformation portion and a first engagement portion. The first deformation portion undergoes elastic deformation associated with vibrations of the vibrator in the first direction. The first engagement portion is in engagement with the vibrator in such a manner that the vibrator is capable of producing a sliding motion associated with vibrations of the vibrator in the second direction.

Yet further, an electronic device is provided according to the present disclosure that includes the vibration motor and a second housing. The vibration motor is accommodated in the second housing.

The vibrator support structure as disclosed herein reduces stress exerted on a joint between the housing and the support member by which the vibrator vibrating in two different directions is supported within the housing. The vibration motor according to the present disclosure ensures a high degree of reliability of the joint between the housing and the support member by which the vibrator is supported within the housing, and the vibration motor is thus capable of generating stable vibrations in two different directions. Moreover, the electronic device disclosed herein enables a reduction in the attenuation of vibrations providing cutaneous sensation feedback, indicating the touch of a key, or notifying the user of an incoming call or message.

BRIEF DESCRIPTION OF DRAWINGS

FIG. 1(A) illustrates the vibration motor 100 viewed from above downward in a state in which a first portion 1a (see FIG. 2) of a housing 1 is cut away.

FIG. 16(B) is a perspective view of an example of S1a2, which is the other component of the support member S1a.

FIG. 19(B) is a perspective view of an example of S1a2, which is the other component of the support member S1a.

FIG. 1(A) illustrates the vibration motor 200 viewed from above downward in a state in which the first portion 1a of the housing 1 is cut away.

DETAILED DESCRIPTION OF EMBODIMENTS

Hereinafter, features of the present disclosure will be described with reference to the accompanying drawings. In the following description of exemplary embodiments of a vibration motor, the same or like parts are denoted by the same reference signs throughout, and redundant description thereof will be omitted in some places.

Exemplary Embodiment of Vibration Motor

The following describes a vibration motor 100 with reference to FIGS. 1 and 2. The vibration motor 100 is a vibration motor that includes a vibrator support structure according to the present disclosure.

Figure 1A:
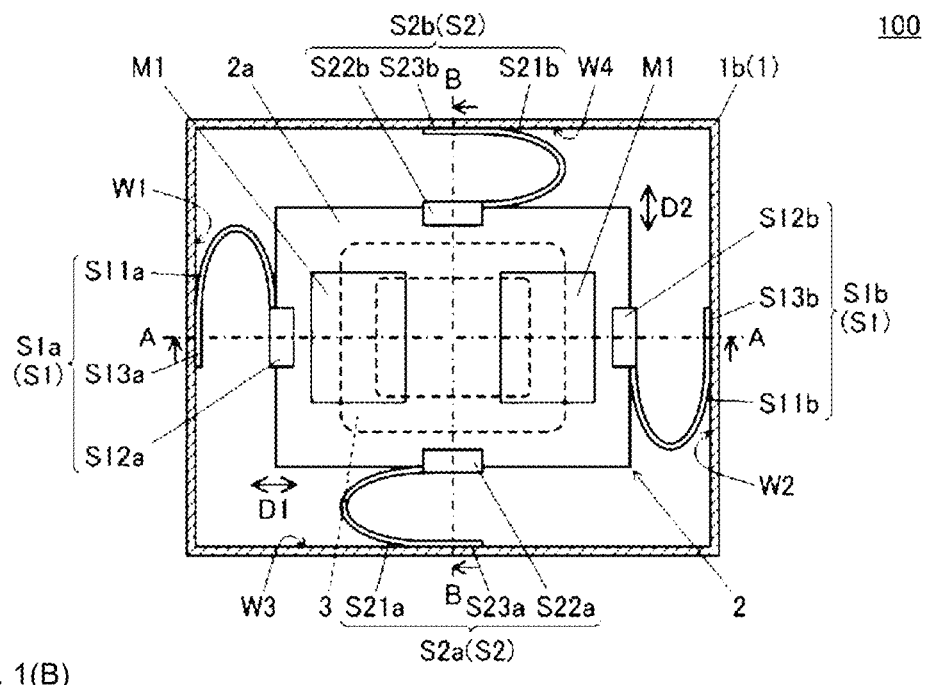
FIG. 1(A) is a plan view of a vibration motor 100 including a vibrator support structure according to the present disclosure, and more specifically.
Figure 1B:
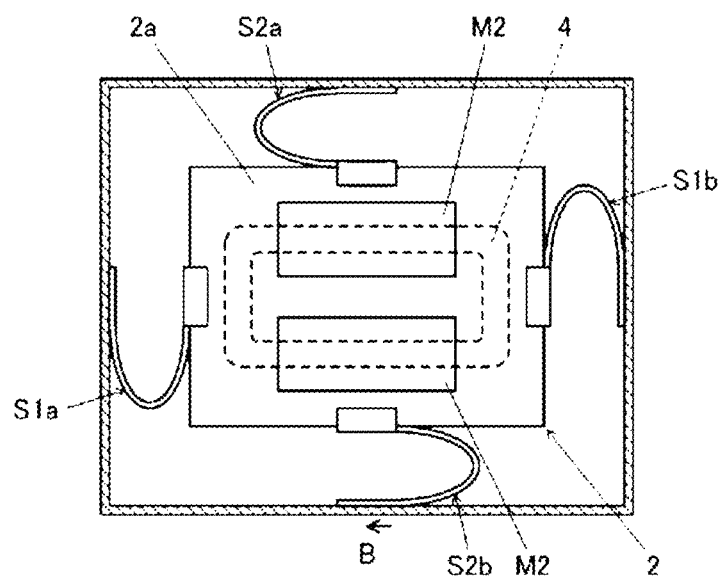
FIG. 1(B) is a plan view of the vibration motor 100, illustrating the vibration motor 100 viewed from below upward in a state in which a second portion 1b (see FIG. 2) of the housing 1 is cut away.
Figure 2A:
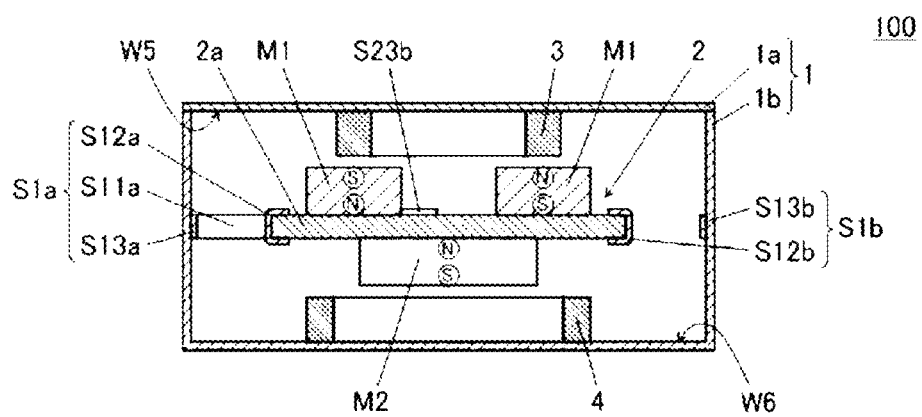
FIG. 2(A) is a sectional view of the vibration motor 100 taken along line A-A in FIG. 1(A), illustrating the vibration motor 100 viewed in the direction of arrows.
Figure 2B:
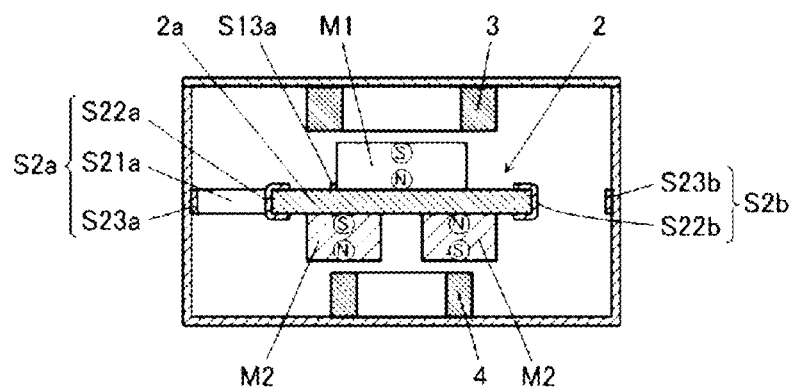
FIG. 2(B) is a sectional view of the vibration motor 100 taken along line B-B in FIG. 1(A), illustrating the vibration motor 100 viewed in the direction of arrows.

FIG. 1(A) is a plan view of the vibration motor 100, illustrating the vibration motor 100 viewed from above downward in a state in which a first portion 1a (see FIG. 2) of a housing 1 is cut away. FIG. 1(B) is a plan view of the vibration motor 100, illustrating the vibration motor 100 viewed from below upward in a state in which a section that is part of a second portion 1b (see FIG. 2) of the housing 1 and faces the first portion 1a is cut away. FIG. 2(A) is a sectional view of the vibration motor 100 taken along line A-A in FIG. 1(A), illustrating the vibration motor 100 viewed in the direction of arrows. FIG. 2(B) is a sectional view of the vibration motor 100 taken along line B-B in FIG. 1(A), illustrating the vibration motor 100 viewed in the direction of arrows. For purposes of this disclosure (e.g., in FIG. 2(A)), The expression "viewed from above downward" herein means being viewed in the direction from an inner wall W5 to an inner wall W6 of the housing 1, which will be described later. The expression "viewed from below upward" herein means being viewed in the direction from the inner wall W6 to the inner wall W5.

As shown, the vibration motor 100 includes a housing 1 (first housing), a vibrator 2, a coil 3 (first coil), a coil 4 (second coil), a first repulsion mechanism S1, and a second repulsion mechanism S2. The vibrator 2 includes two magnets M1 (first magnets) and two magnets M2 (second magnets). The vibration motor 100 vibrates in two different directions, namely, in a first direction D1 and a second direction D2.

The housing 1 includes a first portion 1a and a second portion 1b and is a rectangular parallelepiped having inner walls W1 to W6. The first portion 1a of the housing 1 of the vibration motor 100 is a lid in the form of a flat plate, and the second portion 1b of the housing 1 of the vibration motor 100 is a receptacle including a flat plate portion and four side wall portions. The flat plate portion is in the form of a flat plate and faces the first portion 1a. Each side wall portion is in the form of a flat plate and extends from the flat plate portion to the first portion 1a. It is noted that although the outside shape of the housing 1 is a rectangular parallelepiped having an enclosed structure, the outside shape of the housing 1 is not limited thereto. The housing 1 may, for example, be cylindrical, and part of the housing 1 may be open in alternative aspects. The second portion 1b includes a receptacle main body 1b1 and a fixed section 1b2, which will be described later. The fixed section 1b2 is illustrated neither in FIGS. 1(A)-(B) nor in FIGS. 2(A)-(B), and the same applies hereafter.

The inner walls W1 to W4 are side wall surfaces of the housing 1 illustrated in FIGS. 1(A) and 1(B). The inner walls W1 and W2 face each other, and the inner walls W3 and W4 face each other. The inner wall W5 is an inner top surface of the housing 1 illustrated in FIGS. 2(A) and 2(B), and the inner wall W6 is an inner bottom surface of the housing 1 and faces the inner wall W5.

The vibrator 2 is accommodated in the second portion 1b of the housing 1. The vibrator 2 includes a substrate 2a, which is rectangular when viewed from above downward, that is, when viewed in the direction defined as above. The substrate 2a has two principal surfaces, two side surfaces (first side surfaces) extending in the second direction D2, and two side surfaces (second side surfaces) extending in the first direction D1. The two magnets M1 are fixed to one of the two principal surfaces of the substrate 2a and spaced apart from each other in the first direction D1 in such a manner that each magnet M1 faces the winding portion of the coil 3, which will be described later. The magnetic poles of each of the two magnets M1 are aligned parallel to the winding axis of the coil 3, and unlike poles of the two magnets M1 face each other as shown in FIG. 2(A), for example.

More specifically, one of the two magnets M1 (i.e., the magnet M1 on the left in FIG. 2(A)) is disposed in such a manner that the south pole faces (i.e., is close to) the coil 3 and the north pole faces (i.e., is close to) the substrate 2a. The other magnet M1 (i.e., the magnet M1 on the right in FIG. 2(A)) is disposed in such a manner that the north pole faces (i.e., is close to) the coil 3 and the south pole faces (i.e., is close to) the substrate 2a.

Preferably, the two magnets M1 of the vibration motor 100 have the same shape. The two magnets M1 coincide with each other when viewed in the first direction D1. The magnets M1 may have other shapes. Moreover, in some embodiments, only one magnet M1 is provided. With the two magnets M1 of the vibration motor 100 being arranged as described above, a greater Lorentz force acts on the coil 3, which will be described later.

Another magnet may be interposed between the two magnets M1 in such a manner that the magnetic field generated by the array of the two magnets M1 and this additional magnet is concentrated on the region facing the coil 3. In this case, the south pole of the additional magnet faces (i.e., is close to) one of the two magnets M1, and the north pole of the additional magnet faces (i.e., is close to) the other magnet M1.

When being energized, the coil 3 provides driving force to the magnets M1 in such a way as to enable the vibrator 2 to vibrate in the first direction D1. The winding of the coil 3 and energizing paths (wiring paths) to the coil 3 are illustrated neither in FIG. 1 nor in FIG. 2. The coil 3 of the vibration motor 100 is fixed to the inner wall W5 of the housing 1 in such a manner that the winding axis of the coil 3 extends in the direction normal to the inner wall W5 of the housing 1, that is, the winding axis of the coil 3 is orthogonal to the first direction D1. The coil 3 is rectangular when viewed in plan in the direction of the winding axis. In some embodiments, corners of the coil 3 that is rectangular in shape are curved to a certain extent, for convenience of winding.

When a current flows through the coil 3, the magnetic field generated by the magnets M1 induces a Lorentz force that acts on the coil 3 in a direction orthogonal to the direction of the magnetic field and to the flow of current. With the coil 3 being fixed to the housing 1, reaction force of the Lorentz force is exerted on the magnets M1. The coil 3 under energized conditions thus provides driving force in the first direction D1 to the magnet M1, and by extension, to the vibrator 2.

As mentioned above, the coil 3 is rectangular when viewed in the direction of the winding axis. Such a rectangular coil compares advantageously with an annular coil in ensuring that the Lorentz force acts in the first direction D1. The rectangular shape of the coil 3 is conducive to providing the vibrator 2 with greater driving force in the first direction D1 and is thus preferred over the annular shape.

Moreover, the two magnets M2 are fixed to the other principal surface of the substrate 2a and spaced apart from each other in the second direction D2 crossing the first direction D1 in such a manner that each magnet M2 faces the winding portion of the coil 4, which will be described later.

The magnetic poles of each of the two magnets M2 are aligned parallel to the winding axis of the coil 4, and unlike poles of the two magnets M2 face each other.

More specifically, one of the two magnets M2 (i.e., the magnet M2 on the left in FIG. 2(B)) is disposed in such a manner that the north pole faces (i.e., is close to) the coil 4 and the south pole faces (i.e., is close to) the substrate 2a. The other magnet M2 (i.e., the magnet M2 on the right in FIG. 2(B)) is disposed in such a manner that the south pole faces (i.e., is close to) the coil 4 and the north pole faces (i.e., is close to) the substrate 2a.

The first direction D1 and the second direction D2 defined in relation to the vibration motor 100 are orthogonal to each other in the exemplary aspect. The orthogonality between the first direction D1 and the second direction D2 implies not only orthogonality in a strict sense, but also approximate orthogonality resulting from unit-to-unit variations.

Preferably, the two magnets M2 of the vibration motor 100 have the same shape. The two magnets M2 coincide with each other when viewed in the second direction D2. The magnets M2 may have other shapes. In some embodiments, only one magnet M2 is provided. With the two magnets M2 of the vibration motor 100 being arranged as described above, a greater Lorentz force acts on the coil 4, which will be described later.

Another magnet may be interposed between the two magnets M2 in such a manner that the magnetic field generated by the array of the two magnets M2 and this additional magnet is concentrated on the region facing the coil 4. In this case, the north pole of the additional magnet faces (i.e., is close to) one of the two magnets M2, and the south pole of the additional magnet faces (i.e., is close to) the other magnet M2.

When being energized, the coil 4 provides driving force to the magnets M2 in such a way as to enable the vibrator 2 to vibrate in the second direction D2. The winding of the coil 4 and energizing paths (wiring paths) to the coil 4 are illustrated neither in FIG. 1 nor in FIG. 2. The coil 4 of the vibration motor 100 is fixed to the inner wall W6 of the housing 1 in such a manner that the winding axis of the coil 4 extends in the direction normal to the inner wall W6 of the housing 1, that is, the winding axis of the coil 4 is orthogonal to the second direction D2. The coil 4 is rectangular when viewed in plan in the direction of the winding axis. In some embodiments, corners of the coil 4 that is rectangular in shape are curved to a certain extent, for convenience of winding.

When a current flows through the coil 4, the magnetic field generated by the magnets M2 induces a Lorentz force that acts on the coil 4 in a direction orthogonal to the direction of the magnetic field and to the flow of current. With the coil 4 being fixed to the housing 1, reaction force of the Lorentz force is exerted on the magnets M2. The coil 4 under energized conditions thus provides driving force in the second direction D2 to the magnet M2, and by extension, to the vibrator 2.

As mentioned above, the coil 4 is rectangular when viewed in the direction of the winding axis. Such a rectangular coil compares advantageously with an annular coil in ensuring that the Lorentz force acts in the second direction D2. The rectangular shape of the coil 4 is conducive to providing the vibrator 2 with greater driving force in the second direction D2 and is thus preferred over the annular shape.

The first repulsion mechanism S1 causes repulsion between the housing 1 and the vibrator 2 in the first direction D1. The vibrator 2 is movable in the second direction D2.

The first repulsion mechanism S1 includes a support member S1a and a support member S1b (first support members), by which the vibrator 2 is supported within the housing 1.

The support member S1a includes a deformation portion S11a and an engagement portion S12a. When viewed from above downward (e.g., in Fi. 1(A)), the deformation portion S11a has a U-shape with an open end facing the inner wall W3. The deformation portion S11a undergoes elastic deformation associated with vibrations of the vibrator 2 in the first direction D1. The engagement portion S12a is in engagement with the vibrator 2 in such a manner that the vibrator 2 is capable of (or configured for) producing a sliding motion associated with vibrations of the vibrator 2 in the second direction D2.

As mentioned above, the engagement portion S12a and the vibrator 2 are in engagement with each other. This means that the engagement portion S12a and the vibrator 2 are in contact with each other with one fitting in the other. The vibrator 2 is capable of (or configured for) producing a sliding motion associated with vibrations of the vibrator 2 in the second direction D2. This means that the vibrator 2 is movable in the second direction D2 with the engagement portion S12a and the vibrator 2 being kept in contact with each other in the manner mentioned above. These conditions are achievable in a three-dimensional structure that will be described later.

The support member S1b includes a deformation portion S11b and an engagement portion S12b. When viewed from above downward, the deformation portion S11b has a U-shape with an open end facing the inner wall W4. The deformation portion S11b undergoes elastic deformation associated with vibrations of the vibrator 2 in the first direction D1. The engagement portion S12b is in engagement with the vibrator 2 in such a manner that the vibrator 2 is capable of (or configured for) producing a sliding motion associated with vibrations of the vibrator 2 in the second direction D2. The interpretation above applies correspondingly to the engagement portion S12b being in engagement with the vibrator 2 and to the vibrator 2 being capable of (or configured for) producing a sliding motion associated with vibrations of the vibrator 2 in the second direction D2.

A fixed portion S13a extends from the deformation portion S11a and is in the form of a flat plate. The fixed portion S13a is connected to the inner wall W1 such that the support member S1a is fixed to the housing 1. A fixed portion S13b extends from the deformation portion S11b and is in the form of a flat plate. The fixed portion S13b is connected to the inner wall W2 such that the support member S1b is fixed to the housing 1. The vibrator 2 is held between the engagement portion S12a of the support member S1a and the engagement portion S12b of the support member S1b in a manner so as to be movable in the second direction D2 and supported within the housing 1.

The deformation portion S11a of the support member S1a is preferably warped in advanced in such a way as to exert force on the vibrator 2 in the direction from the inner wall W1 to the inner wall W2, and the deformation portion S11b of the support member S1b is preferably warped in advance in such a way as to exert force on the vibrator 2 in the direction from the inner wall W2 to the inner wall W1.

The deformation portions S11a and S11b are preferably warped in advance in such a way as to ensure that the engagement portion S12a of the support member S1a and the engagement portion S12b of the support member S1b remain in engagement with the vibrator 2 when the vibrator 2 vibrates with maximum amplitude in the first direction D1.

The fixed portion S13a of the support member S1a and the fixed portion S13b of the support member S1b are preferably connected to the housing 1 in such a manner that the joint between the fixed portion S13a and the housing 1 and the joint between the fixed portion S13b and the housing 1 are located on the symmetry axis in the first direction D1 of the substrate 2a in the state prior to vibration of the vibrator 2 in two different directions. This layout and configuration effectively eliminates or reduces deflection of vibrations when the vibrator 2 vibrates in the first direction D1.

The second repulsion mechanism S2 causes repulsion between the housing 1 and the vibrator 2 in the second direction D2. The vibrator 2 is movable in the first direction D1. The second repulsion mechanism S2 includes a support member S2a and a support member S2b (second support members), by which the vibrator 2 is supported within the housing 1.

The support member S2a includes a deformation portion S21a and an engagement portion S22a. When viewed from above downward, the deformation portion S21a has a U-shape with an open end facing the inner wall W2. The deformation portion S21a undergoes elastic deformation associated with vibrations of the vibrator 2 in the second direction D2. The engagement portion S22a is in engagement with the vibrator 2 in such a manner that the vibrator 2 is capable of (or configured for) producing a sliding motion associated with vibrations of the vibrator 2 in the first direction D1. The interpretation above applies correspondingly to the engagement portion S22a being in engagement with the vibrator 2 and to the vibrator 2 being capable of (or configured for) producing a sliding motion associated with vibrations of the vibrator 2 in the first direction D1.

The support member S2b includes a deformation portion S21b and an engagement portion S22b. When viewed from above downward, the deformation portion S21b has a U-shape with an open end facing the inner wall W1. The deformation portion S21b undergoes elastic deformation associated with vibrations of the vibrator 2 in the second direction D2. The engagement portion S22b is in engagement with the vibrator 2 in such a manner that the vibrator 2 is capable of (or configured for) producing a sliding motion associated with vibrations of the vibrator 2 in the first direction D1. The interpretation above applies correspondingly to the engagement portion S22b being in engagement with the vibrator 2 and to the vibrator 2 being capable of (or configured for) producing a sliding motion associated with vibrations of the vibrator 2 in the first direction D1.

A fixed portion S23a extends from the deformation portion S21a and is in the form of a flat plate. The fixed portion S23a is connected to the inner wall W3 such that the support member S2a is fixed to the housing 1. A fixed portion S23b extends from the deformation portion S21b and is in the form of a flat plate. The fixed portion S23b is connected to the inner wall W4 such that the support member S2b is fixed to the housing 1. The vibrator 2 is held between the engagement portion S22a of the support member S2a and the engagement portion S22b of the support member S2b in a manner so as to be movable in the first direction D1 and supported within the housing 1.

The deformation portion S21a of the support member S2a is preferably warped in advanced in such a way as to exert force on the vibrator 2 in the direction from the inner wall W3 to the inner wall W4, and the deformation portion S21b of the support member S2b is preferably warped in advance in such a way as to exert force on the vibrator 2 in the direction from the inner wall W4 to the inner wall W3.

The deformation portions S21a and S21b are preferably warped in advance in such a way as to ensure that the engagement portion S22a of the support member S2a and the engagement portion S22b of the support member S2b remain in engagement with the vibrator 2 when the vibrator 2 vibrates with maximum amplitude in the second direction D2.

The fixed portion S23a of the support member S2a and the fixed portion S23b of the support member S2b are preferably connected to the housing 1 in such a manner that the joint between the fixed portion S23a and the housing 1 and the joint between the fixed portion S23b and the housing 1 are located on the symmetry axis in the second direction D2 of the substrate 2a in the state prior to vibration of the vibrator 2 in two different directions. This layout and configuration effectively eliminates or reduces deflection of vibrations when the vibrator 2 vibrates in the second direction D2.

The support member S1a included in the first repulsion mechanism S1 of the vibration motor 100 will be described below in more detail with reference to FIGS. 3 and 4.

Figure 3A:
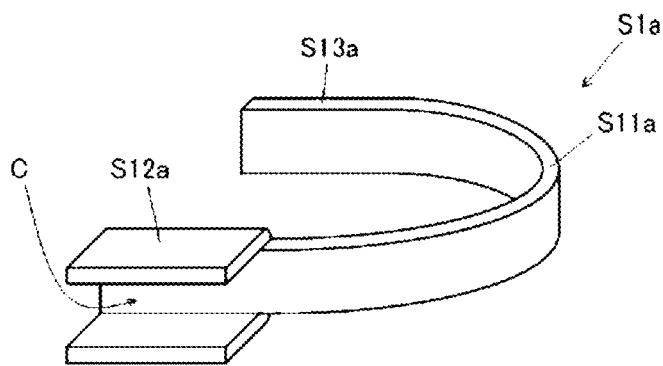
FIG. 3(A) is a perspective view of a support member Sla of a first repulsion mechanism S1 included the vibration motor 100.
Figure 3B:
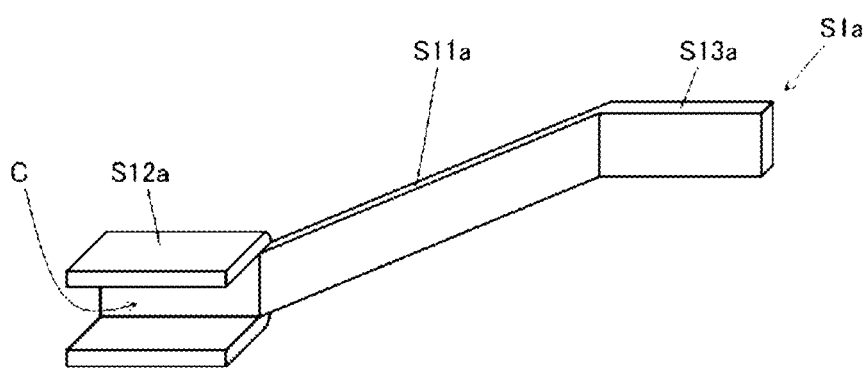
FIGS. 3(B) and 3(C) are perspective views of first and second modifications, respectively, of the support member.
Figure 3C:
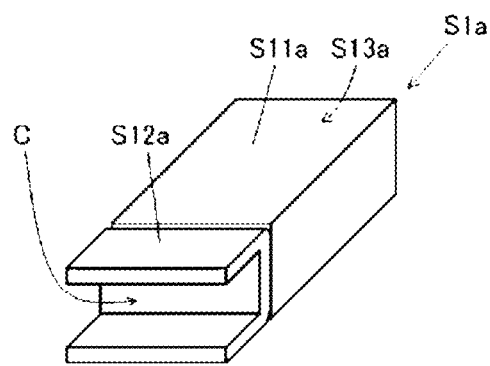

FIG. 3(A) illustrates the support member S1a, and FIGS. 3(B) and 3(C) are perspective views of first and second modifications, respectively, of the support member S1a. The support member S1b is structurally and functionally similar to the support member S1a and will not be further elaborated here.

FIG. 3(A) illustrates the support member S1a of the vibration motor 100, which has been described so far. As mentioned above, the support member S1a includes the deformation portion S11a, the engagement portion S12a, and the fixed portion S13a.

The deformation portion S11a is an elastic member processed into a strip that is U-shaped when viewed from above downward. When being mounted in the vibration motor 100, the support member S1a is elastically deformable in the first direction D1. According to an exemplary aspect, the deformation portion S11a may, for example, be made of ribbon steel, bainite steel, stainless steel, phosphor bronze, or beryllium bronze. The width of the deformation portion S11a, which is an elastic member in the form of a strip, is equal to the thickness of the substrate 2a.

The engagement portion S12a has a recess C. The engagement portion S12a of the support member S1a illustrated in FIG. 3(A) includes a flat plate part and two plate-like members. The flat plate part extends from the deformation portion S11a, which is U-shaped. The two plate-like members are connected to the flat plate part in such a manner that the engagement portion S12a has a square-cornered C-shape when viewed in cross section. The support member S1a is mounted in the vibration motor 100 in such a manner that the inner part of the recess C is in contact with one of the first side surfaces of the substrate 2a. In this state, the engagement portion S12a is in engagement with the vibrator 2 in such a manner that the vibrator 2 is capable of (or configured for) producing a sliding motion associated with vibrations of the vibrator 2 in the second direction D2.

The deformation portion S11a and the engagement portion S12a form one member. Alternatively, the deformation portion S11a and the engagement portion S12a may be discrete members. Referring to FIG. 3(A), the flat plate part of the engagement portion S12a extends from the deformation portion S11a and is parallel to the fixed portion S13a. It is not required that the flat plate part be parallel to the fixed portion S13a.

As mentioned above, the deformation portion S11a is preferably warped in advance in such a way as to ensure that the engagement portion S12a remains in engagement with the vibrator 2 when the vibrator 2 vibrates with maximum amplitude in the first direction D1. To be more specific, the deformation portion S11a is preferably warped in advance in such a way as to ensure that the flat plate part of the engagement portion S12a extending from the deformation portion S11a remains in contact with one of the first side surfaces of the substrate 2a.

The fixed portion S13a extends in the form of a flat plate from the deformation portion S11a and is provided with a view toward ease in fixing the support member S1a to the housing 1 and toward enhancement of strength. The deformation portion S11a may be shaped in such a way as to eliminate the need for the fixed portion S13a; that is, the deformation portion S11a may be connected directly to the housing 1.

In the case that the support member S1a illustrated in FIG. 3(A) is mounted in the vibration motor 100, the fixed portion S13a under the influence of vibrations of the vibrator 2 in the first direction D1 is pressed against the housing 1. The reliability of the joint between the support member S1a and the housing 1 is increased accordingly. In this respect, the support member S1a illustrated in FIG. 3(A) is preferable.

FIG. 3(B) illustrates a first modification of the support member S1a. The support member S1a illustrated in FIG. 3(B) also includes the deformation portion S11a, the engagement portion S12a, and the fixed portion S13a. The deformation portion S11a in the first modification is an elastic member in the form of a strip. The deformation portion S11a extends in a straight line when viewed from above downward. The engagement portion S12a and the fixed portion S13a are similar to the ones illustrated in FIG. 3(A) and will not be further elaborated here.

In the case that the support member S1a illustrated in FIG. 3(B) as the first modification is mounted in the vibration motor 100, the deformation portion S11a under the influence of vibrations of the vibrator 2 in the first direction D1 may be deformed to a greater extent. The level of vibrations of the vibrator 2 is increased accordingly. In this respect, the support member S1a illustrated in FIG. 3(B) is preferable.

FIG. 3(C) illustrates a second modification of the support member S1a. The support member S1a illustrated in FIG. 3(C) also includes the deformation portion S11a, the engagement portion S12a, and the fixed portion S13a. The deformation portion S11a in the second modification is an elastic member in the form of a rectangular parallelepiped. In exemplary aspect, the deformation portion S11a may, for example, be made of styrene-butadiene rubber, epoxy rubber, or silicone rubber. The engagement portion S12a in the second modification is a strip-like member and has a square-cornered C-shape when viewed in cross section. The engagement portion S12a is connected to one end of the deformation portion S11a. The fixed portion S13a is the other end of the deformation portion S11a.

In the case that the support member S1a illustrated in FIG. 3(C) as the second modification is mounted in the vibration motor 100, the fixed portion S13a under the influence of vibrations of the vibrator 2 in the first direction D1 is pressed against the housing 1. The reliability of the joint between the support member S1a and the housing 1 is increased accordingly. In this respect, the support member S1a illustrated in FIG. 3(C) is preferable.

Figure 4A:
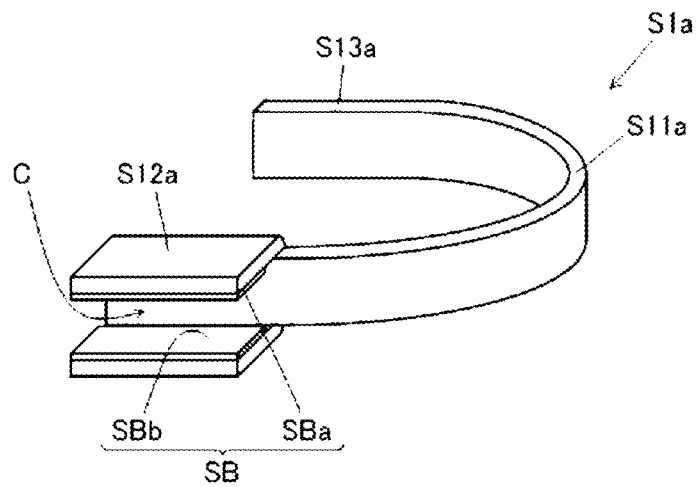
FIGS. 4(A) to 4(C) are perspective views of third to fifth modifications, respectively, of the support member Sla.
Figure 4B:
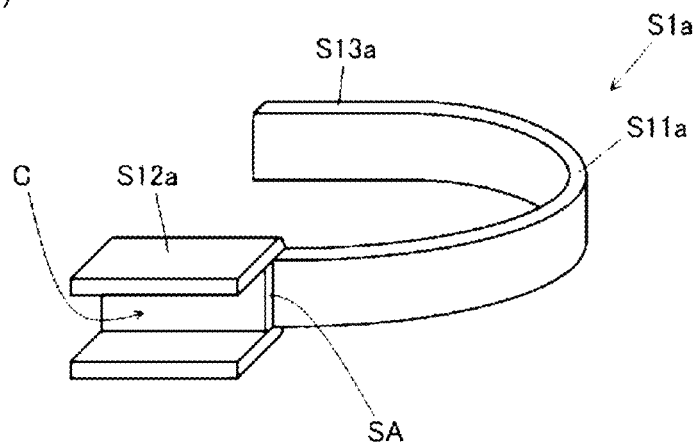
Figure 4C:
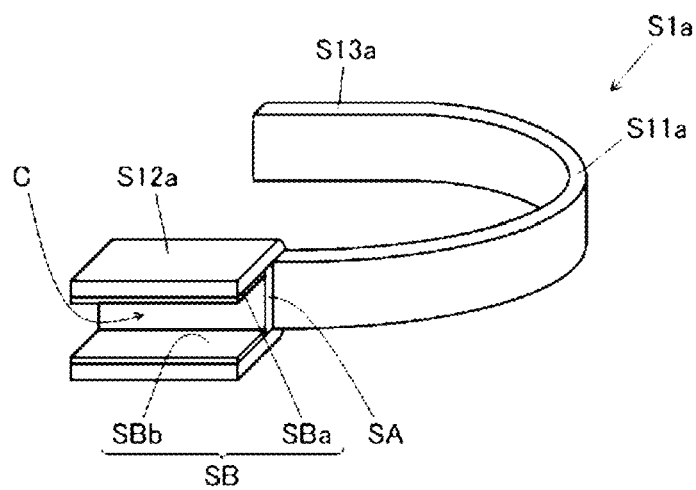

FIGS. 4(A) to 4(C) are perspective views of third to fifth modifications, respectively, of the support member S1a. FIG. 4(A) illustrates a third modification of the support member S1a. In the third modification, an antifriction member SBa and an antifriction member SBb are stuck on the respective plate-like members by which the recess C of the engagement portion S12a is defined. The friction between the substrate 2a and the recess C is reduced accordingly. The antifriction members SBa and SBb may, for example, be made of fluororesin, polyacetal, polyphenylene sulfide, or polyolefin resin. The antifriction members SBa and SBb may be stuck on one principal surface and the other principal surface, respectively, of the substrate 2a.

FIG. 4(B) illustrates a fourth modification of the support member S1a. In the fourth modification, a shock-absorbing member SA is stuck on the flat plate part extending from the deformation portion S11a, with the recess C of the engagement portion S12a being defined on the flat plate part. The possibility of breakage caused by a collision in the recess C between the flat plate part extending from the deformation portion S11a and one of the first side surfaces of the substrate 2a is eliminated or reduced accordingly.

FIG. 4(C) illustrates a fifth modification of the support member S1a. The design in the fifth modification is modeled on the design in the third modification and the design in the fourth modification; that is, the antifriction members SBa and SBb and the shock-absorbing member SA are stuck to the recess C of the engagement portion S12a. The effect of the third modification and the effect of the fourth modification are both attained.

As described above, the vibrator support structure of the vibration motor 100 includes the housing 1, the vibrator 2, the support members S1a and S1b (the first support members), and the support members S2a and S2b (the second support members). The vibrator 2 is slidable in the first direction D1 and the second direction D2.

When the vibrator 2 vibrates in the first direction D1, the support members S1a and S1b act as spring mechanisms and cause repulsion between the housing 1 and the vibrator 2. When the vibrator 2 vibrates in the second direction D2, the vibrator 2 slides in such a way as to reduce the stress exerted on the joint between the housing 1 and the support member S1a and on the joint between the housing 1 and the support member S1b.

The same configuration goes for the support members S2a and S2b. When the vibrator 2 vibrates in the second direction D2, the support members S2a and S2b act as spring mechanisms and cause repulsion between the housing 1 and the vibrator 2. When the vibrator 2 vibrates in the first direction D1, the vibrator 2 slides in such a way as to reduce the stress exerted on the joint between the housing 1 and the support member S2a and on the joint between the housing 1 and the support member S2b.

In the exemplary aspect, the support members S1a, S1b, S2a, and S2b, by which the vibrator 2 is supported within the housing 1, are joined to the housing 1 with a high degree of reliability, thus enabling the vibration motor 100 to generate stable vibrations in two different directions, namely, in the first direction D1 and the second direction D2.

The inner walls W1 to W4 of the housing 1 of the vibration motor 100 are all at the same distance from the substrate 2a, which is rectangular in shape. This means that the support members S1a, S1b, S2a, and S2b have the same shape in the exemplary aspect. Alternatively, it is noted that the shape of the support members S1a and S1b may be different from the shape of the support members S2a and S2b.

The support members S1a and S1b included in the vibration motor 100 have their respective openings facing the opposite inner walls. Similarly, the support members S2a and S2b included in the vibration motor 100 have their respective openings facing the opposite inner walls. Alternatively, the support members S1a and S1b may have their respective openings facing the same inner wall, and the support members S2a and S2b may have their respective openings facing the same inner wall. In other words, the support members S1a and S1b may be open toward the same inner wall, and the support members S2a and S2b may be open toward the same inner wall in various exemplary aspects.

First Modification of the Vibration Motor

The following describes a vibration motor 100A with reference to FIGS. 5 and 6. The vibration motor 100A is a first modification of the vibration motor 100 according to the present disclosure.

Figure 5A:
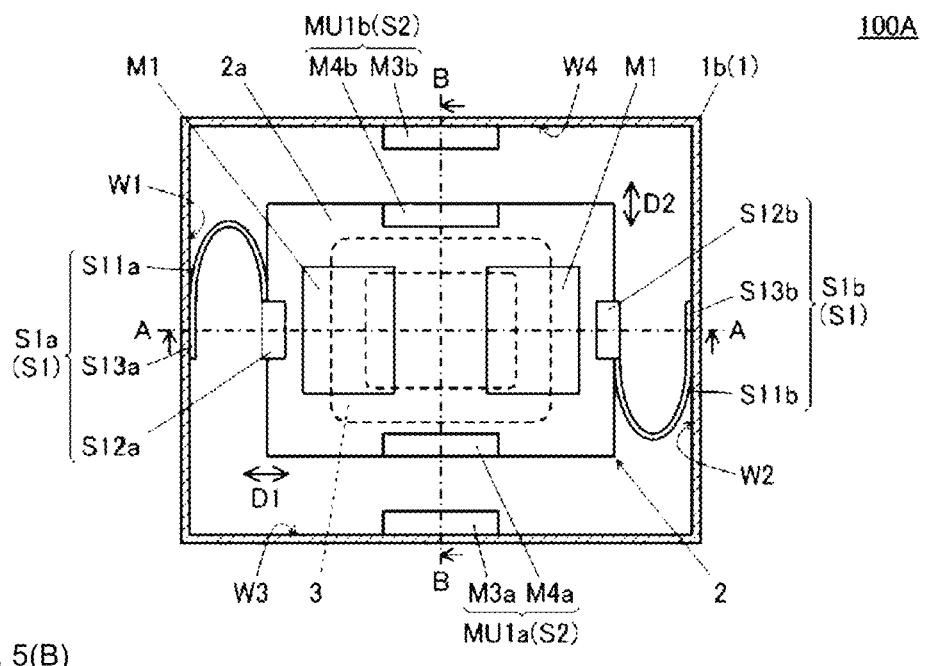
FIG. 5(A) is a plan view analogous to FIG. 1(A) and illustrates a vibration motor 100A, which is a first modification of the vibration motor 100.
Figure 5B:
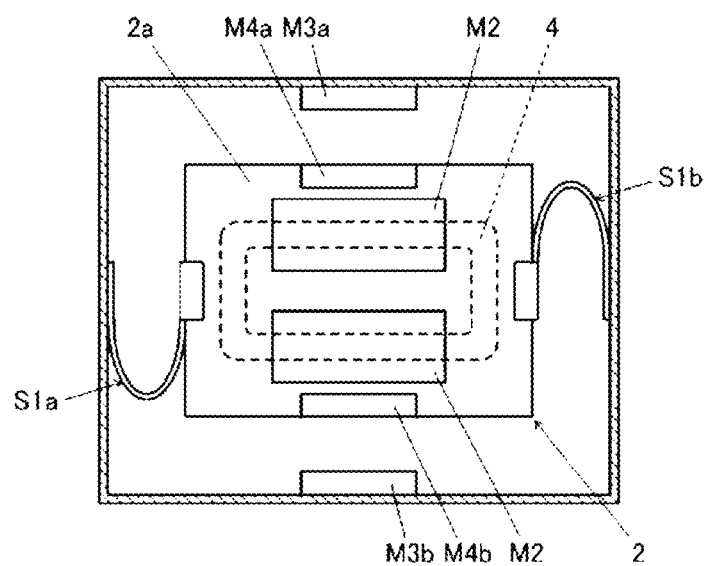
FIG. 5(B) is a plan view analogous to FIG. 1(B) and illustrates the vibration motor 100A.
Figure 6A:
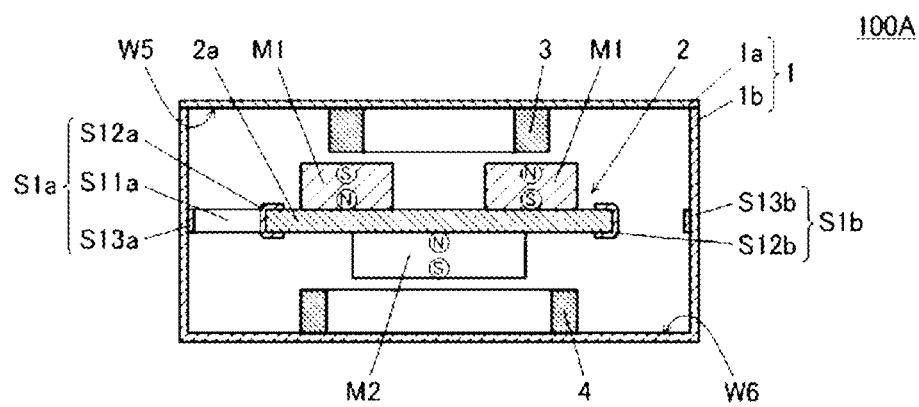
FIG. 6(A) is a sectional view analogous to FIG. 2(A) and illustrates the vibration motor 100A viewed in the direction of arrows.
Figure 6B:
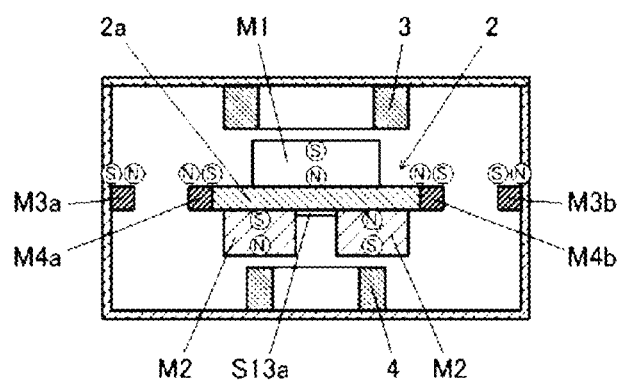
FIG. 6(B) is a sectional view analogous to FIG. 2(B) and illustrates the vibration motor 100A viewed in the direction of arrows.

FIGS. 5(A) and 5(B), which illustrate the vibration motor 100A, are plan views analogous to FIGS. 1(A) and 1(B), respectively. FIGS. 6(A) and 6(B), which illustrate the vibration motor 100A, are plan views analogous to FIGS. 2(A) and 2(B), respectively. The difference between the vibration motor 100A and the vibration motor 100 is in the design of the second repulsion mechanism S2. The vibration motor 100A is otherwise similar to the vibration motor 100 and will not be described in full detail.

In particular, the second repulsion mechanism S2 of the vibration motor 100A includes a magnet unit MU1a (first magnet unit) and a magnet unit MU1b (first magnet unit). The magnet unit MU1a includes a magnet M3a (third magnet) and a magnet M4a (fourth magnet). Similarly, the magnet unit MU1b includes a magnet M3b (third magnet) and a magnet M4b (fourth magnet). The magnet units MU1a and MU1b each act as a magnetic spring mechanism as described in more detail below.

The magnet M3a is fixed to the inner wall W3 of the housing 1 in such a manner that the magnetic poles of the magnet M3a are aligned in the second direction D2. The inner walls of the housing 1 are arranged as illustrated in FIGS. 1 and 2, and the same applies hereafter. The magnet M4a is fixed to one of the second side surfaces of the substrate 2a in such a manner that the magnetic poles of the magnet M4a are aligned in the second direction D2. The magnets M3a and M4a are disposed in a manner so as to repel each other in the second direction D2.

To avoid a collision between the vibrator 2 and the housing 1, the magnet M4a is fixed to the substrate 2a in such a manner that the distance between the magnets M3a and M4a prior to vibration is equal to or less than the distance between an end face of the substrate 2a and the housing 1. This layout enables the magnetic spring mechanism to work effectively. In light of miniaturization, the distance between the magnets M3a and M4a prior to vibration is preferably equal to the distance between the end face of the substrate 2a and the inner wall W3.

The magnet M3b is fixed to the inner wall W4 of the housing 1 in such a manner that the magnetic poles of the magnet M3b are aligned in the second direction D2. The magnet M4b is fixed to the other second side surface of the substrate 2a in such a manner that the magnetic poles of the magnet M4b are aligned in the second direction D2. The magnets M3b and M4b are disposed in a manner so as to repel each other in the second direction D2.

The magnet M4b is fixed to the substrate 2a in manner similar to the magnet M4a. More specifically, the distance between the magnets M3b and M4b prior to vibration is equal to or less than the distance between the end face of the substrate 2a and the housing 1 and is preferably equal to the distance between the end face of the substrate 2a and the housing 1. As further shown, the vibrator 2 of the vibration motor 100A includes the substrate 2a, the two magnets M1 (first magnets), the two magnets M2 (second magnets), the magnets M3a and M3b (third magnets), and the magnets M4a and M4b (fourth magnets).

As illustrated in FIG. 5(A), the magnets M3a, M4a, M3b, and M4b in the vibration motor 100A are aligned on the same axis extending in the second direction D2 when viewed in plan. As illustrated in FIG. 6(B), the north pole of the magnet M3a and the north pole of the magnet M4a face each other, and the south pole of the magnet M3b and the south pole of the magnet M4b face each other. The magnets M3a and M4a in this orientation constitute one of two magnetic mechanisms for the vibrations of the vibrator 2 in the second direction D2, and the magnets M3b and M4b in this orientation constitute the other magnetic mechanism.

The second repulsion mechanism S2 of the vibration motor 100A does not include the support members that support the vibrator 2. The vibrator 2 is supported within the housing 1 by the support members S1a and S1b. As mentioned above, the stress exerted on the joint between the housing 1 and the support member S1a and on the joint between the housing 1 and the support member S1b are reduced, and the reliability of the joint between the housing 1 and the support member S1a and the reliability of the joint between the housing 1 and the support member S1b are increased correspondingly. This configuration enables the vibration motor 100A to generate stable vibrations in two different directions, namely, in the first direction D1 and the second direction D2.

Figure 7A:
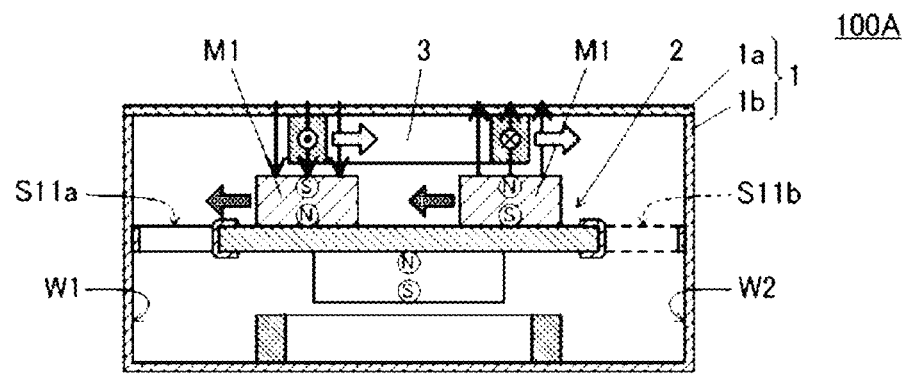
FIGS. 7(A) to 7(C) are sectional views analogous to FIG. 2(A) and illustrate a series of actions in a first direction D1 of the vibration motor 100A viewed in the direction of arrows.
Figure 7B:
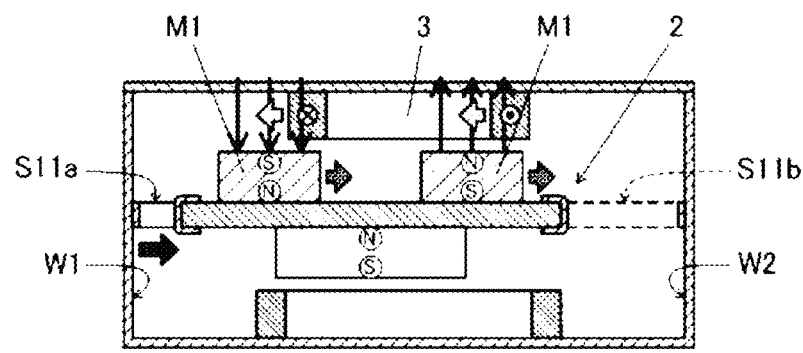
Figure 7C:
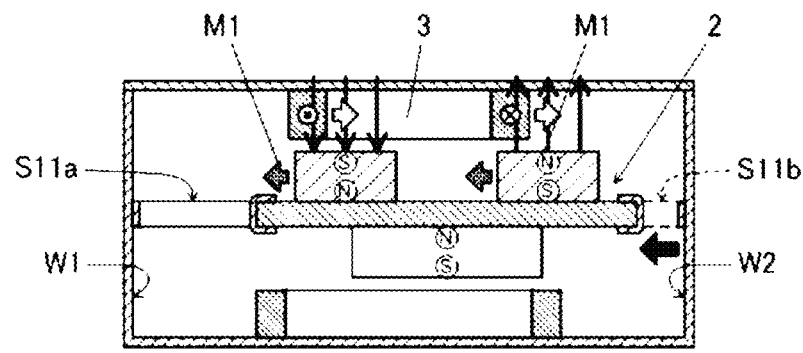

The following describes the action of the vibration motor 100A with reference to FIGS. 7(A)-(C) and 8(A)-(C). FIGS. 7(A) to 7(C) are sectional views analogous to FIG. 2(A) and illustrate a series of actions in the first direction D1 of the vibration motor 100A.

FIG. 7(A) illustrates a state in which energization of the coil 3 is initiated, where the vibrator 2 does not vibrate. A section of the coil 3 is marked with symbols. The symbol on the left indicates that a current flows in the direction from the back to the front on the drawing plane. The symbol on the right indicates that a current flows in the direction from the front to the back on the drawing plane. Upward-pointing arrows coming out of the north pole of one of the magnets M1 and downward pointing arrows going into the south pole of the other magnet M1 denote the direction of the magnetic field generated by the magnets M1.

When a current flows through the coil 3 in the direction denoted by the above-mentioned symbols, the magnetic field generated by the magnets M1 induces a Lorentz force that acts on the coil 3 in a direction orthogonal to the direction of the magnetic field and to the flow of current, as indicated by right-pointing arrows in FIG. 7(A). With the coil 3 being fixed to the housing 1, reaction force of the Lorentz force is exerted on the magnets M1, as indicated by left-pointing arrows in FIG. 7(A). Consequently, driving force is provided in such a way as to cause the vibrator 2 to shift in the first direction D1 toward the left on the drawing plane.

FIG. 7(B) illustrates a state in which the direction of the current flowing through the coil 3 is reversed after the shift of the vibrator 2 toward the left on the drawing plane. The shift of the vibrator 2 toward the left causes the deformation portion S11a of the support member S1a between the vibrator 2 and the inner wall W1 of the housing 1 to undergo elastic deformation in the direction in which the support member S1a is compressed. The elastic deformation causes repulsion between the vibrator 2 and the inner wall W1. Consequently, force is exerted on the vibrator 2 in such a way as to move the vibrator 2 toward the right on the drawing plane, as indicated by right-pointing arrows in FIG. 7(B).

The deformation portion S11*b* of the support member S1*b* between the vibrator 2 and the inner wall W2 of the housing 1 undergoes elastic deformation in the direction in which the support member S11*b* is stretched. As mentioned above, the deformation portion S11*b* is warped in advanced in such a way as to exert force on the vibrator 2 in the direction from the inner wall W2 to the inner wall W1. The original warpage in the deformation portion S11*b* is corrected in the state illustrated in FIG. 7(B) such that the deformation portion S11*b* does not exert force on the vibrator 2 in a manner so as to move the vibrator 2 toward the right on the drawing plane.

Meanwhile, reaction force of the force exerted on the vibrator 2 acts on the inner wall W1. With the support member S1*a* being fixed to the second portion 1*b* of the housing 1, the reaction force causes the second portion 1*b* to deform. The deformation is not illustrated in FIG. 7(B), and the same applies hereafter.

The reversal of the direction of the current flowing through the coil 3 also produces a Lorentz force acting on the coil 3 in the direction opposite to the direction of the Lorentz force in FIG. 7(A). When the coil 3 is viewed in the direction of the winding axis, the area of an overlap between the winding portion of the coil 3 and the magnets M1 is smaller in the state illustrated in FIG. 7(B) than in the state illustrated in FIG. 7(A). As indicated by small left-pointing arrows in FIG. 7(B), the Lorentz force acting in the state illustrated in FIG. 7(B) is thus smaller than the Lorentz force acting in the state illustrated in FIG. 7(A). Meanwhile, reaction force of the Lorentz force is exerted on the magnets M1, as indicated by small right-pointing arrows in FIG. 7(B).

The force that is exerted on the vibrator 2 due to the elastic deformation of the deformation portion S11*a* of the support member S1*a* is combined with the reaction force of the Lorentz force such that driving force is provided in such a way as to cause the vibrator 2 to shift in the first direction D1 toward the right on the drawing plane.

FIG. 7(C) illustrates a state in which the direction of the current flowing through the coil 3 is reversed after the shift of the vibrator 2 toward the right on the drawing plane. The shift of the vibrator 2 toward the right causes the deformation portion S11*b* of the support member S1*b* between the vibrator 2 and the inner wall W2 of the housing 1 to undergo elastic deformation in the direction in which the support member S1*b* is compressed. The elastic deformation causes repulsion between the vibrator 2 and the inner wall W2. Consequently, force is exerted on the vibrator 2 in such a way as to move the vibrator 2 toward the left on the drawing plane, as indicated by left-pointing arrows in FIG. 7(C).

The deformation portion S11*a* of the support member S1*a* between the vibrator 2 and the inner wall W1 of the housing 1 undergoes elastic deformation in the direction in which the support member S1*a* is stretched. The state illustrated in FIG. 7(C) is similar to the state illustrated in FIG. 7(B); that is, the original warpage in the deformation portion S11*a* is corrected in the state illustrated in FIG. 7(C) such that the deformation portion S11*a* does not exert force on the vibrator 2 in a manner so as to move the vibrator 2 toward the left on the drawing plane.

Meanwhile, reaction force of the force exerted on the vibrator 2 acts on the inner wall W2. With the support member S1*b* being fixed to the second portion 1*b* of the housing 1, the reaction force causes the second portion 1*b* to deform.

The reversal of the direction of the current flowing through the coil 3 also produces a Lorentz force acting on the coil 3 in the direction opposite to the direction of the Lorentz force in FIG. 7(B). When the coil 3 is viewed in the direction of the winding axis, the area of an overlap between the winding portion of the coil 3 and the magnets M1 is smaller in the state illustrated in FIG. 7(C) than in the state illustrated in FIG. 7(A). As indicated by small right-pointing arrows in FIG. 7(C), the Lorentz force acting in the state illustrated in FIG. 7(C) is thus smaller than the Lorentz force acting in the state illustrated in FIG. 7(A). Meanwhile, reaction force of the Lorentz force is exerted on the magnets M1, as indicated by small left-pointing arrows in FIG. 7(C).

The force that is exerted on the vibrator 2 due to the elastic deformation of the deformation portion S11*b* of the support member S1*b* is combined with the reaction force of the Lorentz force such that driving force is provided in such a way as to cause the vibrator 2 to shift in the first direction D1 toward the left on the drawing plane. The vibrator 2 repeats these actions, thus vibrating in the first direction D1. The vibrations of the vibrator 2 causes the housing 1 to undergo repeated deformation, which translates into vibrations of the vibration motor 100A.

The second repulsion mechanism S2 of the vibration motor 100A includes the magnet units MU1*a* and MU1*b* and does not include the support members by which the vibrator 2 is supported within the housing 1. Advantageously, this configuration eliminates joints between the housing 1 and the support members. Thus, the vibrations of the vibrator 2 in the first direction D1 do not affect the reliability of the second repulsion mechanism S2.

Figure 8A:
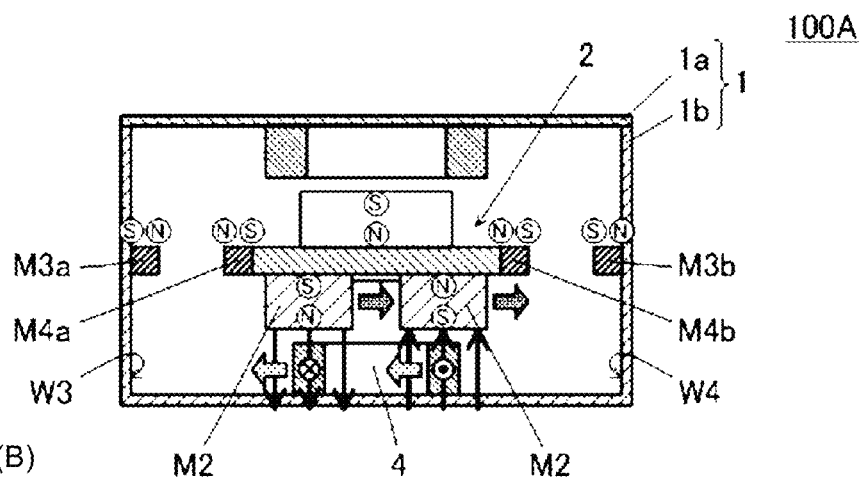
FIGS. 8(A) to 8(C) are sectional views analogous to FIG. 2(B) and illustrate a series of actions in a second direction D2 of the vibration motor 100A viewed in the direction of arrows.
Figure 8B:
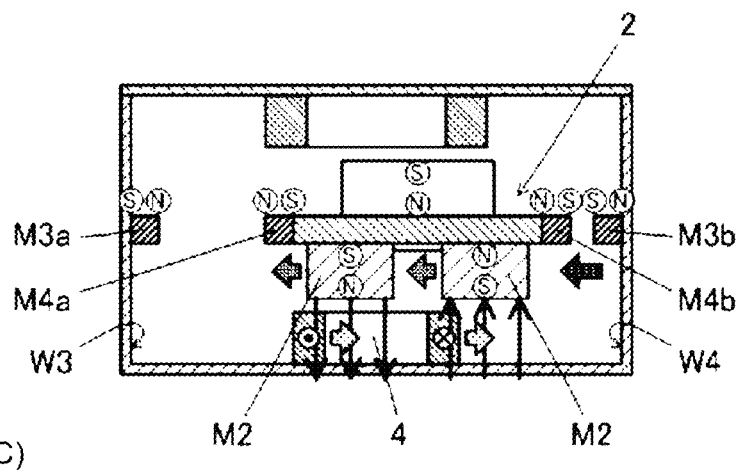
Figure 8C:
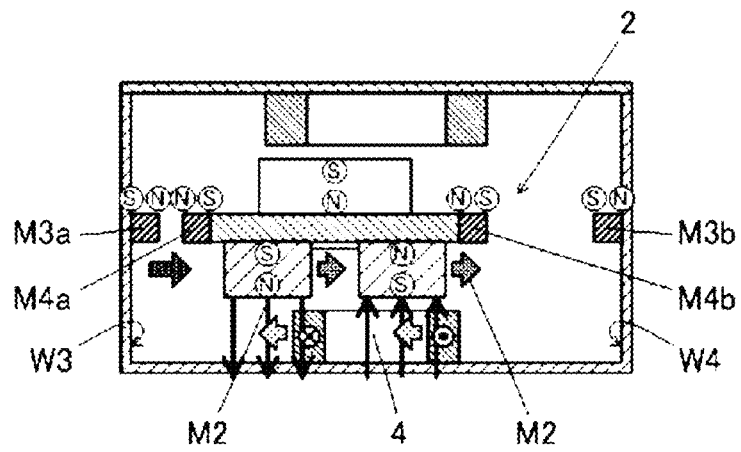

FIGS. 8(A) to 8(C) are sectional views analogous to FIG. 2(B) and illustrate a series of actions in the second direction D2 of the vibration motor 100A.

FIG. 8(A) illustrates a state in which energization of the coil 4 is initiated, where the vibrator 2 does not vibrate. A section of the coil 4 is marked with symbols. The symbol on the left indicates that a current flows in the direction from the front to the back on the drawing plane. The symbol on the right indicates that a current flows in the direction from the back to the front on the drawing plane. Upward-pointing arrows coming out of the north pole of one of the magnets M2 and downward pointing arrows going into the south pole of the other magnet M2 denote the direction of the magnetic field generated by the magnets M2.

When a current flows through the coil 4 in the direction denoted by the above-mentioned symbols, the magnetic field generated by the magnets M2 induces a Lorentz force that acts on the coil 4 in a direction orthogonal to the direction of the magnetic field and to the flow of current, as indicated by left-pointing arrows in FIG. 8(A). With the coil 4 being fixed to the housing 1, reaction force of the Lorentz force is exerted on the magnets M2, as indicated by right-pointing arrows in FIG. 8(A). Consequently, driving force is provided in such a way as to cause the vibrator 2 to shift in the second direction D2 toward the right on the drawing plane.

FIG. 8(B) illustrates a state in which the direction of the current flowing through the coil 4 is reversed after the shift of the vibrator 2 toward the right on the drawing plane. The shift of the vibrator 2 toward the right causes an increase in the repulsion between the magnet M3*b* fixed to the second portion 1*b* (the inner wall W4) of the housing 1 and the magnet M4*b* on the vibrator 2. Consequently, force is exerted on the magnet M4*b* in such a way as to move the magnet M4b toward the left on the drawing plane, as indicated by left-pointing arrows in FIG. 8(B). Meanwhile, reaction force of the force exerted on the magnet M4b acts on the magnet M3b. With the magnet M3b being fixed to the second portion 1b of the housing 1, the reaction force causes the second portion 1b to deform.

The reversal of the direction of the current flowing through the coil 4 also produces a Lorentz force acting on the coil 4 in the direction opposite to the direction of the Lorentz force in FIG. 8(A). When the coil 4 is viewed in the direction of the winding axis, the area of an overlap between the winding portion of the coil 4 and the magnets M2 is smaller in the state illustrated in FIG. 8(B) than in the state illustrated in FIG. 8(A). As indicated by small right-pointing arrows in FIG. 8(B), the Lorentz force acting in the state illustrated in FIG. 8(B) is thus smaller than the Lorentz force acting in the state illustrated in FIG. 8(A). Meanwhile, reaction force of the Lorentz force is exerted on the magnets M2, as indicated by small left-pointing arrows in FIG. 8(B).

The force that is exerted on the magnet M4b as mentioned above is combined with the reaction force of the Lorentz force such that driving force is provided in such a way as to cause the vibrator 2 to shift in the second direction D2 toward the left on the drawing plane.

FIG. 8(C) illustrates a state in which the direction of the current flowing through the coil 4 is reversed after the shift of the vibrator 2 toward the left on the drawing plane. The shift of the vibrator 2 toward the left causes an increase in the repulsion between the magnet M3a fixed to the second portion 1b (the inner wall W3) of the housing 1 and the magnet M4a on the vibrator 2. Consequently, force is exerted on the magnet M4a in such a way as to move the magnet M4a toward the right on the drawing plane, as indicated by right-pointing arrows in FIG. 8(C). Meanwhile, reaction force of the force exerted on the magnet M4a acts on the magnet M3a. With the magnet M3a being fixed to the second portion 1b of the housing 1, the reaction force causes the second portion 1b to deform in the direction opposite to the direction of deformation in FIG. 8(B).

The reversal of the direction of the current flowing through the coil 4 also produces a Lorentz force acting on the coil 4 in the direction opposite to the direction of the Lorentz force in FIG. 8(B). This state is similar to the state illustrated in FIG. 8(B); that is, as indicated by small left-pointing arrows in FIG. 8(C), the Lorentz force acting in the state illustrated in FIG. 8(C) is smaller than the Lorentz force acting in the state illustrated in FIG. 8(A). Meanwhile, reaction force of the Lorentz force is exerted on the magnets M2, as indicated by small right-pointing arrows in FIG. 8(C).

The force that is exerted on the magnet M4a as mentioned above is combined with the reaction force of the Lorentz force such that driving force is provided in such a way as to cause the vibrator 2 to shift in the second direction D2 toward the right on the drawing plane. The vibrator 2 repeats these actions, thus vibrating in the second direction D2. The vibrations of the vibrator 2 causes the housing 1 to undergo repeated deformation, which translates into vibrations of the vibration motor 100A.

The first repulsion mechanism S1 of the vibration motor 100A includes the aforementioned support members S1a and S1b, whereas the second repulsion mechanism S2 of the vibration motor 100A does not include the support members by which the vibrator 2 is supported within the housing 1. That is, the vibrator support structure of the vibration motor 100A includes the housing 1, the vibrator 2, and the support members S1a and S1b. The vibrator 2 is slidable in the first direction D1 and the second direction D2.

When the vibrator 2 included in the vibration motor 100A vibrates in the second direction D2, the stress exerted on the joint between the housing 1 and the support member S1a and on the joint between the housing 1 and the support member S1b is reduced accordingly. This configuration enables the vibration motor 100A to generate stable vibrations in two different directions, namely, in the first direction D1 and the second direction D2.

Second Modification of the Vibration Motor

The following describes a vibration motor 100B with reference to FIG. 9. The vibration motor 100B is a second modification of the vibration motor 100 according to the present disclosure.

Figure 9A:
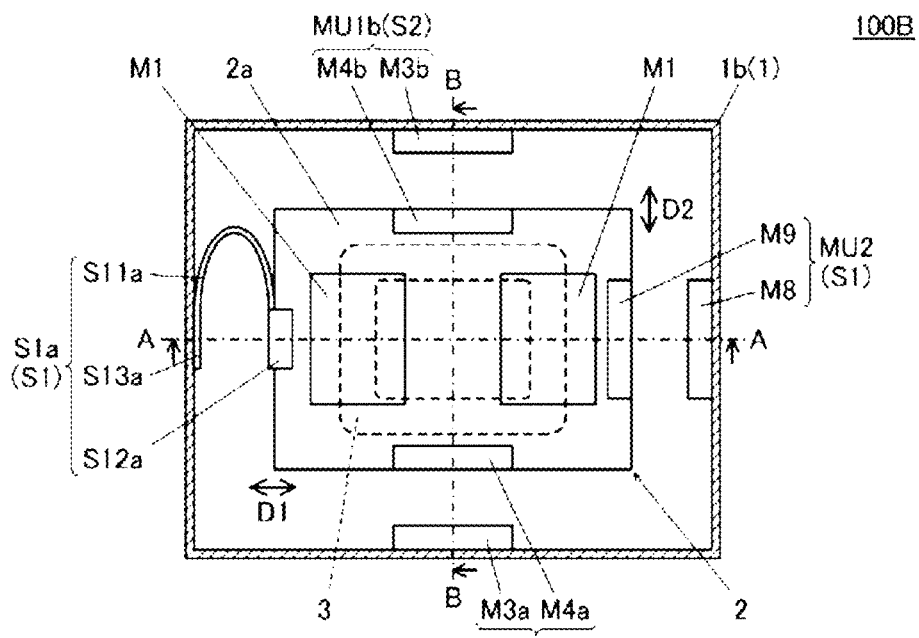
FIG. 9(A) is a plan view analogous to FIG. 1(A) and illustrates a vibration motor 100B, which is a second modification of the vibration motor 100.
Figure 9B:
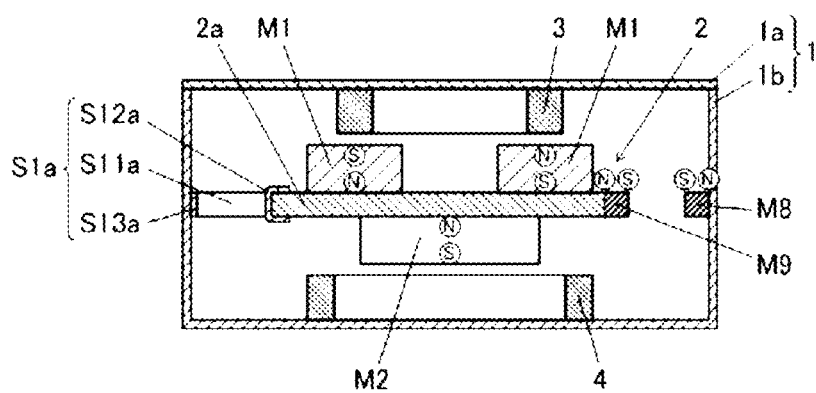
FIG. 9(B) is a sectional view analogous to FIG. 2(A) and illustrates the vibration motor 100B viewed in the direction of arrows.

FIG. 9(A) is a plan view analogous to FIG. 1(A) and illustrates the vibration motor 100B. FIG. 9(B) is a sectional view analogous to FIG. 2(A) and illustrates the vibration motor 100B viewed in the direction of arrows. The difference between the vibration motor 100A and the vibration motor 100B is in the design of the first repulsion mechanism S1. The vibration motor 100B is otherwise similar to the vibration motor 100A and will not be described in full detail.

The first repulsion mechanism S1 of the vibration motor 100B includes the aforementioned support member S1a and a magnet unit MU2 (second magnet unit), which causes repulsion between the housing 1 and the vibrator 2 in the first direction D1. The magnet unit MU2 includes a magnet M8 (eighth magnet) and a magnet M9 (ninth magnet). The magnet unit MU2 acts as a magnetic spring mechanism. This will be described later.

The magnet M8 is fixed to the inner wall W2 of the housing 1 in such a manner that the magnetic poles of the magnet M8 are aligned in the first direction D1. The magnet M9 is fixed to one of the first side surfaces of the substrate 2a in such a manner that the magnetic poles of the magnet M9 are aligned in the first direction D1. The magnets M8 and M9 are disposed in a manner so as to repel each other in the first direction D1.

To avoid a collision between the vibrator 2 and the housing 1, the magnet M9 is fixed to the substrate 2a in such a manner that the distance between the magnets M8 and M9 prior to vibration is equal to or less than the distance between the end face of the substrate 2a and the housing 1. This layout and configuration enables the magnetic spring mechanism to work effectively. In light of miniaturization, the distance between the magnets M8 and M9 prior to vibration is preferably equal to the distance between the end face of the substrate 2a and the inner wall W2.

With the first repulsion mechanism S1 and the second repulsion mechanism S2 being included in the vibration motor 100B, the vibrator 2 is supported by the support member S1a only. That is, the vibrator support structure of the vibration motor 100B includes the housing 1, the vibrator 2, and the support member S1a. The vibrator 2 is slidable in the first direction D1 and the second direction D2. As mentioned above, the stress exerted on the joint between the housing 1 and the support member S1a is reduced, and the reliability of the joint between the housing 1 and the support member S1a is increased correspondingly. This configuration enables the vibration motor 100B to generate stable vibrations in two different directions, namely, in the first direction D1 and the second direction D2.

Third Modification of the Vibration Motor

Figure 10:
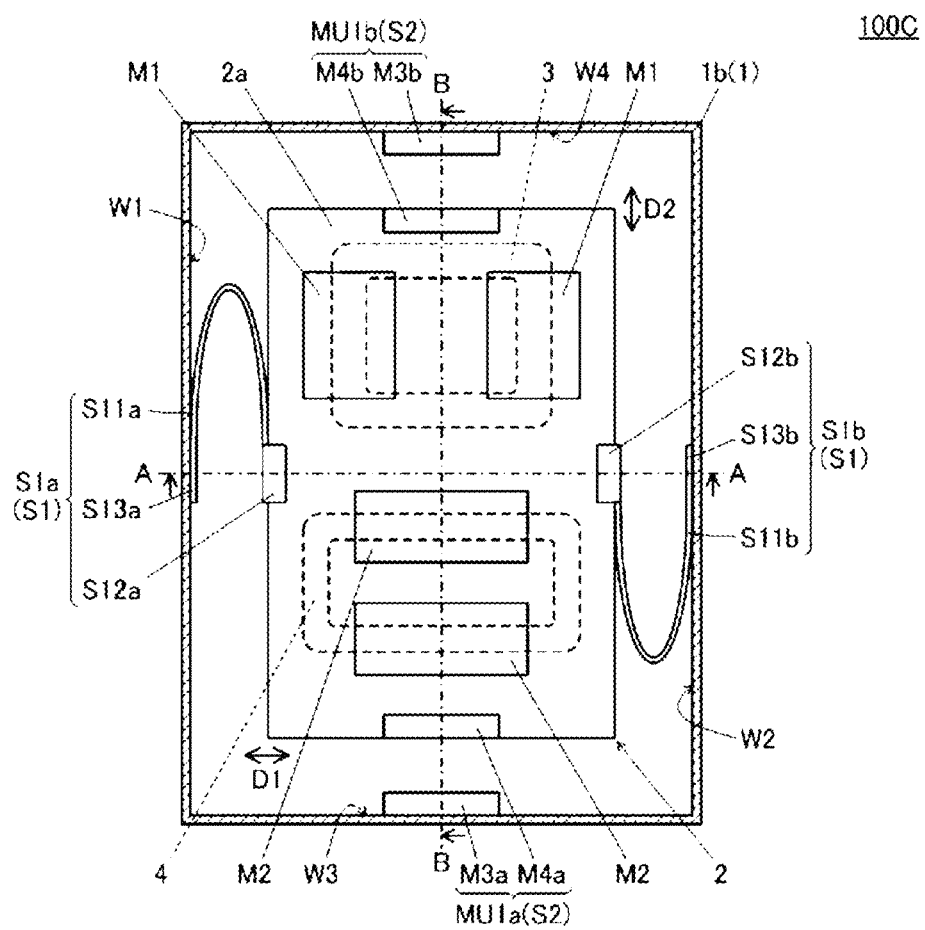
FIG. 10 is a plan view analogous to FIG. 1(A) and illustrates a vibration motor 100C, which is a third modification of the vibration motor 100.
Figure 11A:
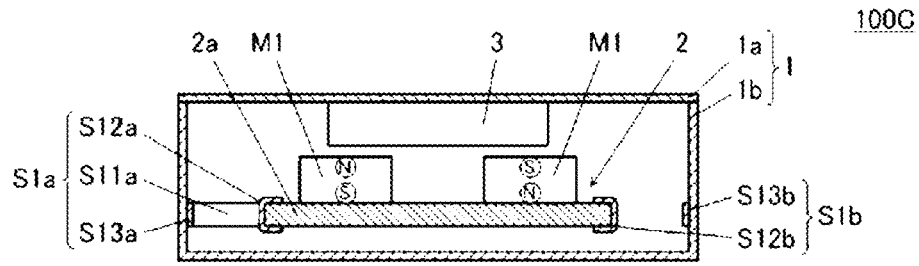
FIG. 11(A) is a sectional view analogous to FIG. 2(A) and illustrates the vibration motor 100C viewed in the direction of arrows.
Figure 11B:
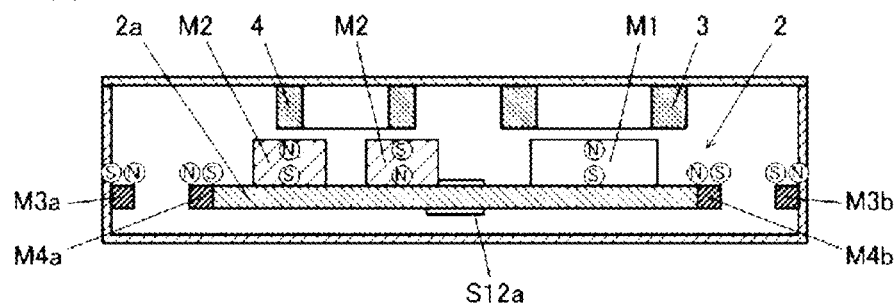
FIG. 11(B) is a sectional view analogous to FIG. 2(B) and illustrates the vibration motor 100C viewed in the direction of arrows.

The following describes a vibration motor 100C with reference to FIGS. 10 and 11(A)-(B). The vibration motor 100C is a third modification of the vibration motor 100 according to the present disclosure.

FIG. 10 is a plan view analogous to FIG. 1(A) and illustrates the vibration motor 100C. FIG. 11(A) is a sectional view analogous to FIG. 2(A) and illustrates the vibration motor 100C viewed in the direction of arrows. FIG. 11(B) is a sectional view analogous to FIG. 2(B) and illustrates the vibration motor 100C viewed in the direction of arrows. The differences between the vibration motor 100C and the vibration motor 100A are in the design of the vibrator 2 and the placement of the coil 4. The vibration motor 100C is otherwise similar to the vibration motor 100A, and redundant description thereof will be omitted.

The vibration motor 100C includes two magnets M1 and two magnets M2, which are all fixed to one of the two principal surfaces of the substrate 2a. The coils 3 and 4 of the vibration motor 100C are fixed to the inner wall W5 of the housing 1 in such a manner that the winding axes of the coils 3 and 4 extend in the direction normal to the inner wall W5 of the housing 1, that is, the winding axes of the coils 3 and 4 are orthogonal to the first direction D1.

The two magnets M1 are fixed to the above-mentioned principal surface of the substrate 2a and spaced apart from each other in the first direction D1 in such a manner that each magnet M1 faces the winding portion of the coil 3. The magnetic poles of each of the two magnets M1 are aligned parallel to the winding axis of the coil 3, and unlike poles of the two magnets M1 face each other. The two magnets M2 are fixed to the above-mentioned principal surface of the substrate 2a and spaced apart from each other in the second direction D2 in such a manner that each magnet M2 faces the winding portion of the coil 4. The magnetic poles of each of the two magnets M2 are aligned parallel to the winding axis of the coil 4, and unlike poles of the two magnets M2 face each other.

The vibrator support structure of the vibration motor 100C is similar to the vibrator support structure of the vibration motor 100A. This configuration enables the vibration motor 100C to generate stable vibrations in two different directions, namely, in the first direction D1 and the second direction D2.

The two magnets M1, the two magnets M2, and the coils 3 and 4 of the vibration motor 100C are all disposed on one of the principal surfaces of the substrate 2a. This layout enables a reduction in the profile of the vibration motor 100C.

Fourth Modification of the Vibration Motor

Figure 12:
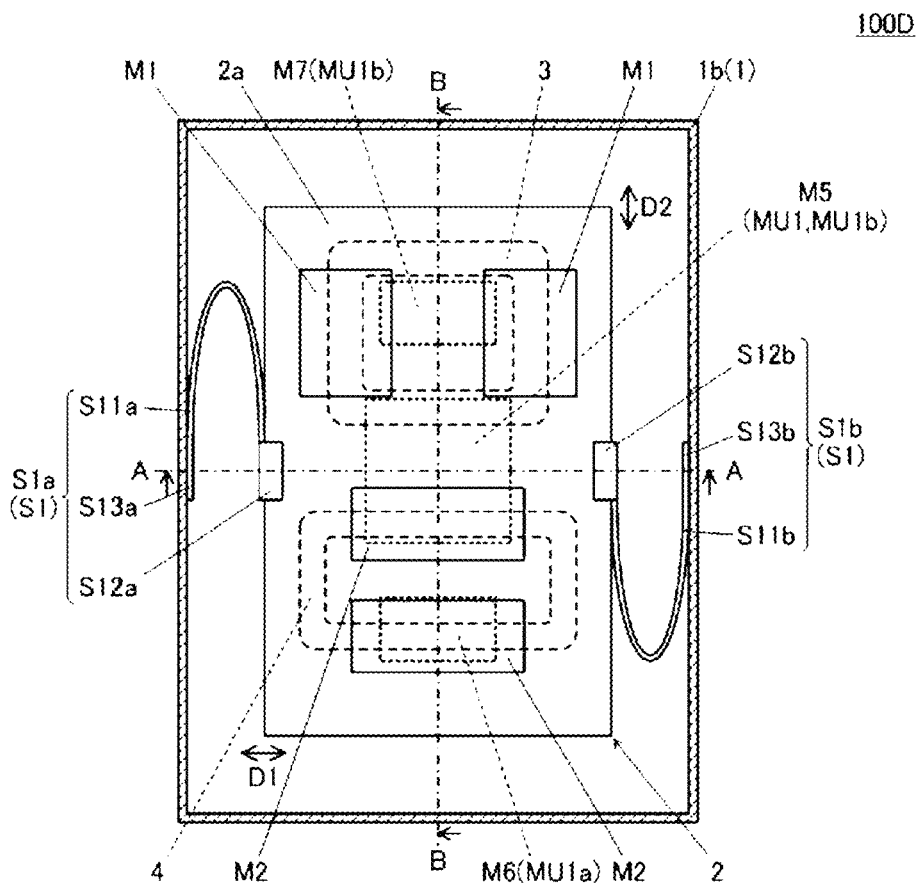
FIG. 12 is a plan view analogous to FIG. 1(A) and illustrates a vibration motor 100D, which is a fourth modification of the vibration motor 100.
Figure 13A:
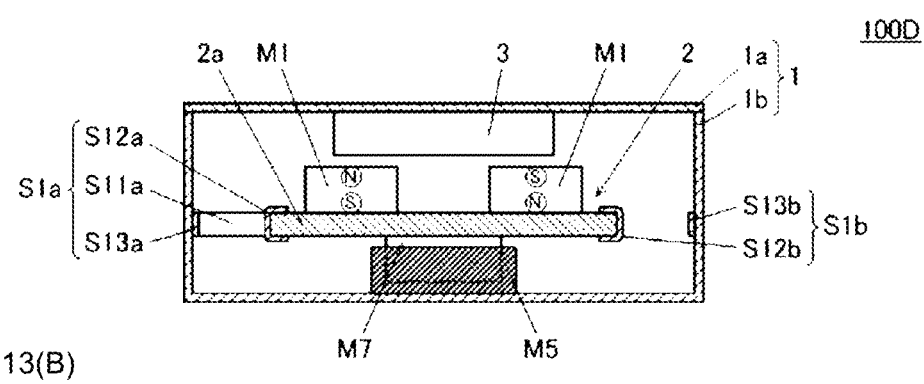
FIG. 13(A) is a sectional view analogous to FIG. 2(A) and illustrates the vibration motor 100D viewed in the direction of arrows.
Figure 13B:
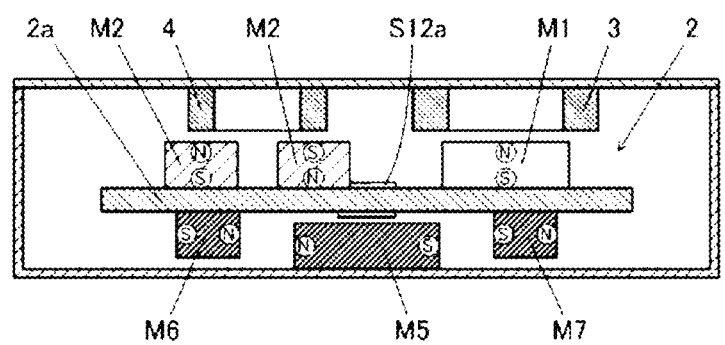
FIG. 13(B) is a sectional view analogous to FIG. 2(B) and illustrates the vibration motor 100D viewed in the direction of arrows.

The following describes a vibration motor 100D with reference to FIGS. 12 and 13(A)-(B). The vibration motor 100D is a fourth modification of the vibration motor 100 according to the present disclosure.

FIG. 12 is a plan view analogous to FIG. 1(A) and illustrates the vibration motor 100D. FIG. 13(A) is a sectional view analogous to FIG. 2(A) and illustrates the vibration motor 100D viewed in the direction of arrows. FIG. 13(B) is a sectional view analogous to FIG. 2(B) and illustrates the vibration motor 100D viewed in the direction of arrows. The difference between the vibration motor 100D and the vibration motor 100C is in the design of the second repulsion mechanism S2. The vibration motor 100D is otherwise similar to the vibration motor 100C and will not be described in full detail.

As shown, the second repulsion mechanism S2 of the vibration motor 100D includes a magnet unit MU1a (first magnet unit) and a magnet unit MU1b (first magnet unit). The magnet unit MU1a includes a magnet M5 (fifth magnet) and a magnet M6 (sixth magnet). The magnet unit MU1b includes the magnet M5 and a magnet M7 (seventh magnet). That is, the magnet M5 is shared by the magnet units MU1a and MU1b. The magnet units MU1a and MU1b each act as a magnetic spring mechanism.

The magnet M5 is fixed to the inner wall W6 of the housing 1 in such a manner that the magnetic poles of the magnet M5 are aligned in the second direction D2. The magnets M6 and M7 are fixed to the other principal surface of the substrate 2a in such a manner that the magnetic poles of each of the magnets M6 and M7 are aligned in the second direction D2. The magnets M5 and M6 are disposed in a manner so as to repel each other in the second direction D2, and the magnets M5 and M7 are disposed in a manner so as to repel each other in the second direction D2. The magnets M6 and M7 are aligned in the second direction with the magnet M5 therebetween. More specifically, the magnet M5 overlaps the center of the substrate 2a when the vibration motor 100D is viewed from above downward.

The vibrator support structure of the vibration motor 100D is similar to the vibrator support structure of the vibration motor 100A. This configuration enables the vibration motor 100D to generate stable vibrations in two different directions, namely, in the first direction D1 and the second direction D2.

The magnet M5 is shared by the magnet units MU1a and MU1b of the vibration motor 100D. The number of components of the vibration motor 100D may thus be smaller, and the production process may be simplified accordingly. This configuration reduces the proportion of the area of the magnet units MU1a and MU1b, and the vibration motor 100D may thus be more compact in size.

The magnets M5 to M7, which constitute the magnetic mechanisms of the vibration motor 100D, overlap one another. The distance between the coil 4 and the axis extending in the second direction D2 through the barycenter of the overlap among the magnets M5 to M7 viewed in the second direction D2 is greater than the distance between the coil 4 and the axis extending in the second direction D2 through the barycenter of the overlap between the two magnets M2, which act as driving magnets on the vibrator 2.

The distance between the coil 3 and the axis extending through the magnets M5 to M7 is greater than the distance between the coil 3 and the axis extending in the first direction D1 through the barycenter of the overlap between the two magnets M1 viewed in the first direction D1. The magnets M1 also act as driving magnets on the vibrator 2. This layout eliminates or reduces the possibility that the magnetic field generated by the magnet M6 will influence the Lorentz force acting on the coil 4. This layout also eliminates or reduces the possibility that the magnetic field generated by the magnet M7 will influence the Lorentz force acting on the coil 3.

Fifth Modification of the Vibration Motor

Figure 14A:
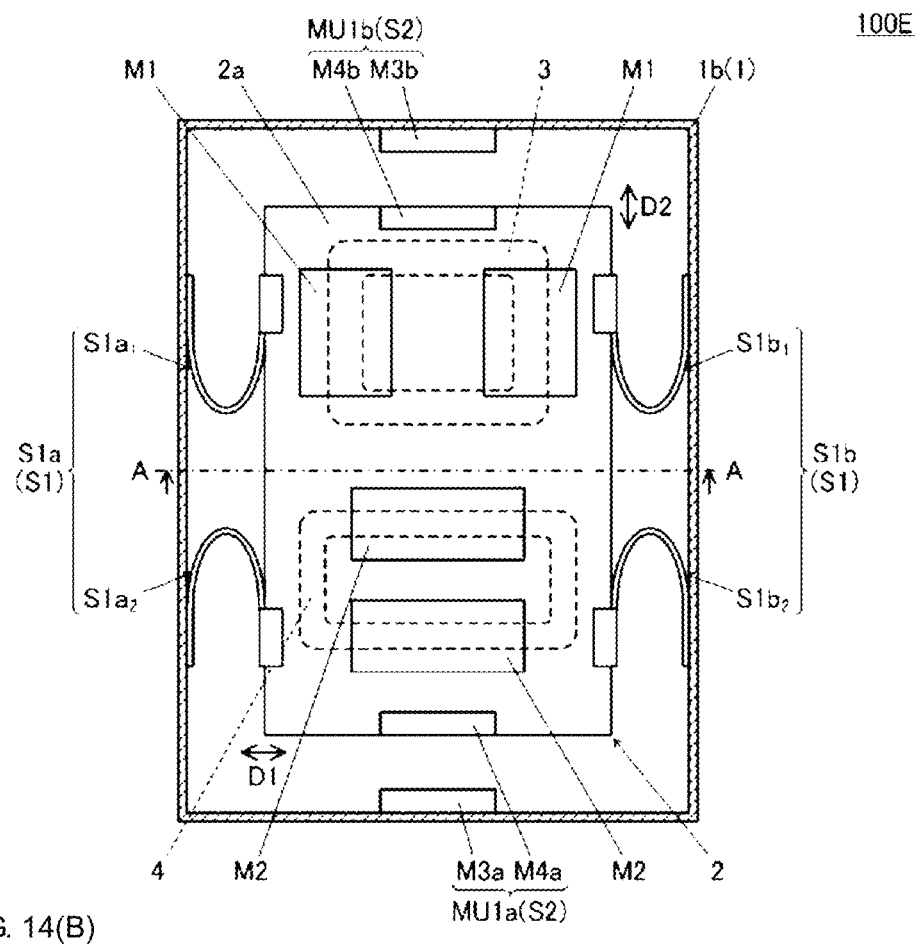
FIG. 14(A) is a plan view analogous to FIG. 1(A) and illustrates a vibration motor 100E, which is a fifth modification of the vibration motor 100.
Figure 14B:
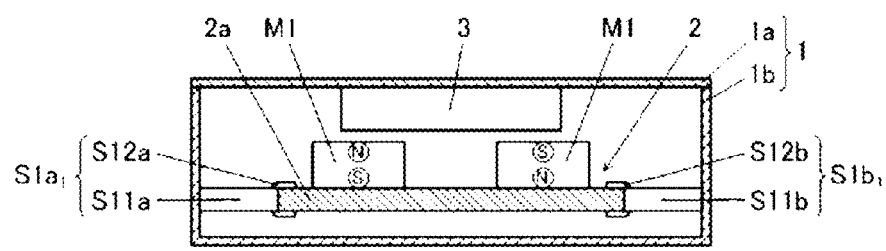
FIG. 14(B) is a sectional view analogous to FIG. 2(A) and illustrates the vibration motor 100E viewed in the direction of arrows.

The following describes a vibration motor 100E with reference to FIGS. 14(A)-(B). The vibration motor 100E is a fifth modification of the vibration motor 100 according to the present disclosure.

FIG. 14(A) is a plan view analogous to FIG. 1(A) and illustrates the vibration motor 100E. FIG. 14(B) is a sectional view analogous to FIG. 2(A) and illustrates the vibration motor 100E viewed in the direction of arrows. The difference between the vibration motor 100E and the vibration motor 100C is in the design of the first repulsion mechanism S1. The vibration motor 100E is otherwise similar to the vibration motor 100C and will not be described in full detail.

The support member S1a included in the first repulsion mechanism S1 of the vibration motor 100E is composed of two components, which are denoted by S1a1 and S1a2, respectively. Similarly, the support member S1b included in the first repulsion mechanism S1 of the vibration motor 100E is composed of two components, which are denoted by S1b1 and S1b2, respectively. The components S1a1 and S1a2 of the support member S1a and the components S1b1 and S1b2 of the support member S1b are structurally and functionally similar to the aforementioned support member S1a.

The vibration motor 100E is structured as follows. The components S1a1 and S1a2 of the support member S1a have their respective fixed portions, which are connected to the inner wall W1 of the housing 1 in a manner so as to be mirror images of each other with respect to the symmetry axis in the first direction D1 of the substrate 2a in the state prior to vibration of the vibrator 2 in two different directions (see FIG. 14(A)). The components S1a1 and S1a2 have their respective deformation portions, which are U-shaped with the respective openings in opposite directions. More specifically, the deformation portion of the component S1a1 has an opening facing the inner wall W4, and the deformation portion of the component S1a2 has an opening facing the inner wall W3.

Similarly, the components S1b1 and S1b2 of the support member S1b have their respective fixed portions, which are connected to the inner wall W2 of the housing 1 in a manner so as to be mirror images of each other with respect to the symmetry axis in the first direction D1 of the substrate 2a in the state prior to vibration of the vibrator 2 in two different directions. The components S1b1 and S1b2 have their respective deformation portions, which are U-shaped with the respective openings in opposite directions. More specifically, the deformation portion of the component S1b1 has an opening facing the inner wall W4, and the deformation portion of the component S1b2 has an opening facing the inner wall W3.

The vibrator 2 included in the vibration motor 100E is supported by these support members. That is, the vibrator support structure of the vibration motor 100E includes the housing 1, the vibrator 2, and the support members. The vibrator 2 is slidable in the first direction D1 and the second direction D2.

As mentioned above, the stress exerted on the joint between the housing 1 and the support member S1a is reduced, and the reliability of the joint between the housing 1 and the support member S1a is increased correspondingly. Effects of such a support member may be attained by these individual support members. This configuration enables the vibration motor 100E to generate stable vibrations in two different directions, namely, in the first direction D1 and the second direction D2.

The support members S1a and S1b are each composed of two component, thus effectively eliminating or reducing deflection of vibrations when the vibrator 2 vibrates in the first direction D1.

Sixth Modification of the Vibration Motor

Figure 15A:
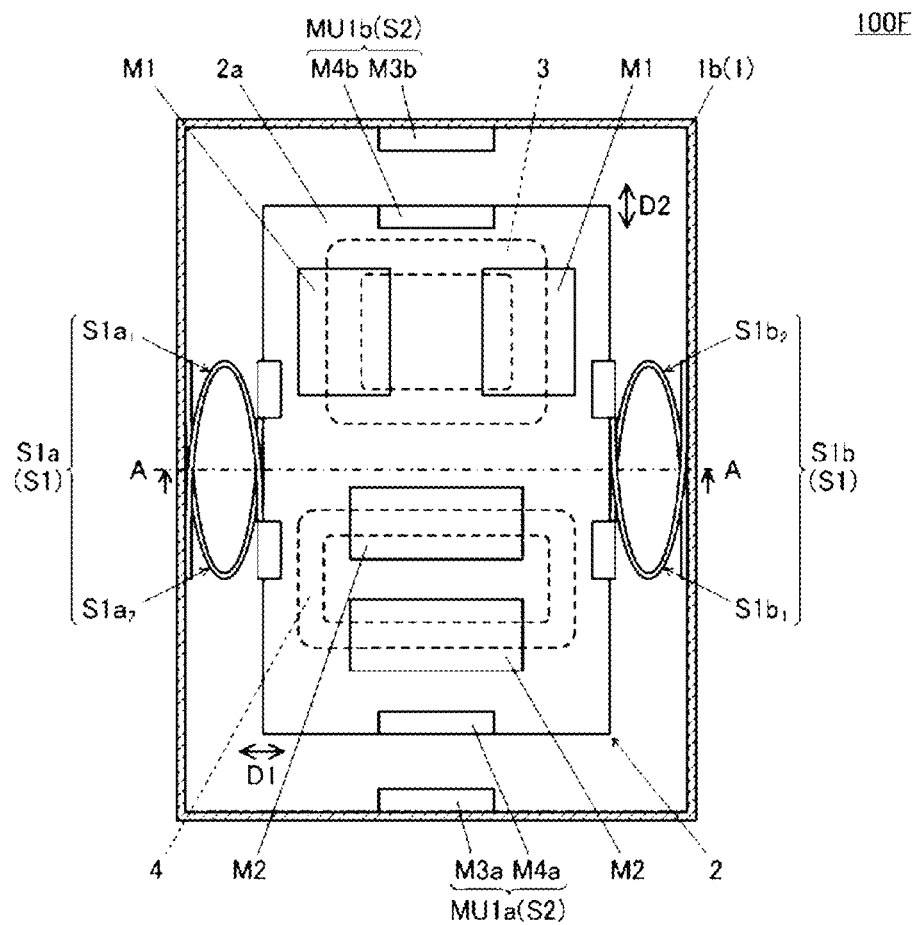
FIG. 15(A) is a plan view analogous to FIG. 1(A) and illustrates a vibration motor 100F, which is a sixth modification of the vibration motor 100.
Figure 15B:
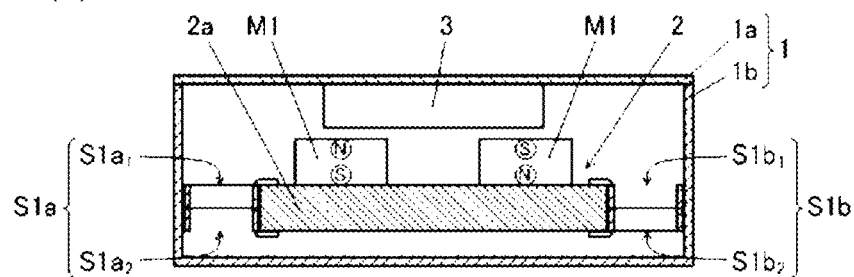
FIG. 15(B) is a sectional view analogous to FIG. 2(A) and illustrates the vibration motor 100F viewed in the direction of arrows.

The following describes a vibration motor 100F with reference to FIGS. 15(A)-(B). The vibration motor 100F is a sixth modification of the vibration motor 100 according to the present disclosure.

FIG. 15(A) is a plan view analogous to FIG. 1(A) and illustrates the vibration motor 100F. FIG. 15(B) is a sectional view analogous to FIG. 2(A) and illustrates the vibration motor 100F viewed in the direction of arrows. The differences between the vibration motor 100F and the vibration motor 100E are in the thickness of the substrate 2a and the design of the first repulsion mechanism S1. The vibration motor 100F is otherwise similar to the vibration motor 100E and will not be described in full detail.

The thickness of substrate 2a of the vibrator 2 included in the vibration motor 100F is twice the width of a deformation portion S11a1, which is an elastic member in the form of a strip and will be described later. The support member S1a included in the first repulsion mechanism S1 of the vibration motor 100F is composed of two components, which are denoted by S1a1 and S1a2, respectively. Similarly, the support member S1b included in the first repulsion mechanism S1 of the vibration motor 100F is composed of two components, which are denoted by S1b1 and S1b2, respectively. The components S1a1 and S1a2 of the support member S1a and the components S1b1 and S1b2 of the support member S1b are functionally similar to the support member S1a in the previous example and are structurally different therefrom.

The components S1a1 and S1a2 of the support member S1a included in the first repulsion mechanism S1 of the vibration motor 100F will be described below in more detail with reference to FIG. 16.

Figure 16A:
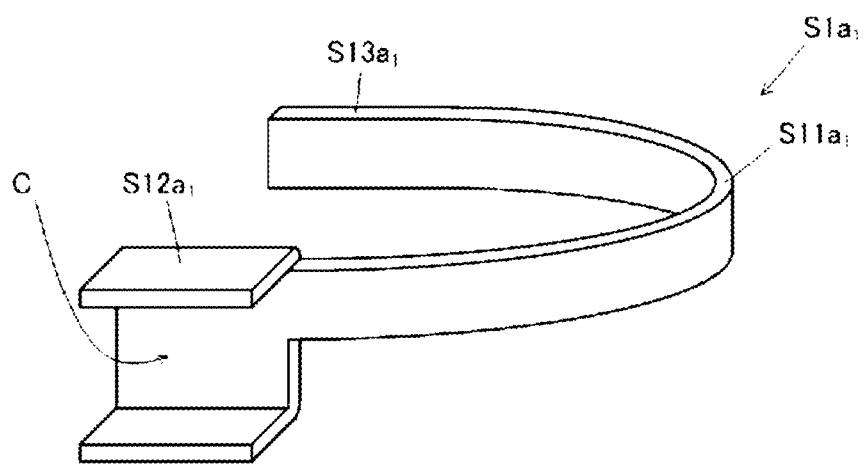
FIG. 16(A) is a perspective view of an example of S1a1, which is one of two components of the support member S1a included in the first repulsion mechanism S1 of the vibration motor 100F.
Figure 16B:
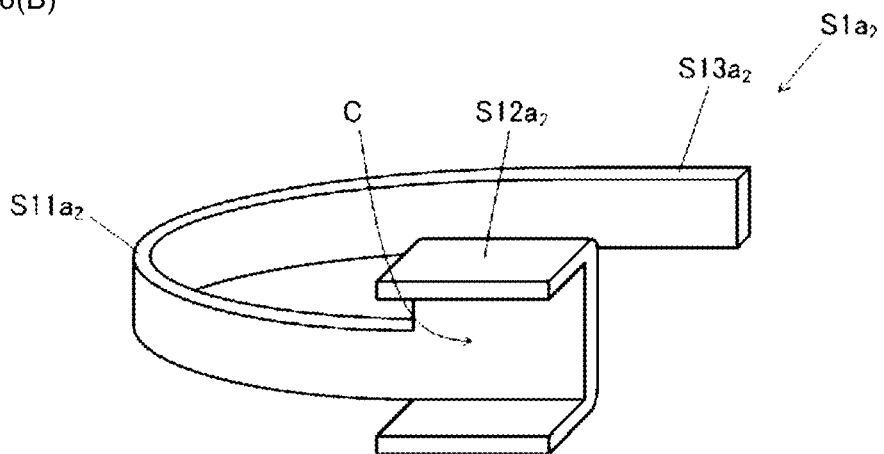

FIG. 16(A) is a perspective view of S1a1, which is one of two components of the support member S1a included in the first repulsion mechanism S1 of the vibration motor 100F. FIG. 16(B) is a perspective view of an example of S1a2, which is the other component the support member S1a. The components S1b1 and S1b2 of the support member S1b are structurally and functionally similar to the components S1a1 and S1a2 of the support member S1a and will not be described in full detail.

The component S1a1 of the support member S1a includes a deformation portion S11a1, an engagement portion S12a1, and a fixed portion S13a1. The deformation portion S11a1 and the fixed portion S13a1 are similar to the deformation portion S11a and the fixed portion S13a, respectively, of the support member S1a in the previous example. The engagement portion S12a1 is similar to the engagement portion S12a of the support member S1a in the previous example. More specifically, the engagement portion S12a1 has a recess C defined by a flat plate part and two plate-like members. The flat plate part extends from the deformation portion S11a1, which is U-shaped. The two plate-like members are connected to the flat plate part in such a manner that the engagement portion S12a1 has a square-cornered C-shape when viewed in cross section. The engagement portion S12a1 is wider than the engagement portion S12a of the support member S1a in the previous example.

The flat plate part extends beyond an edge of the deformation portion S11a1 toward the lower side on the drawing plane (i.e., toward the inner wall W6 of the housing 1). The flat plate part is twice as wide as the deformation portion S11a1. The component S1a1 of the support member S1a is mounted in the vibration motor 100F in such a manner that the inner part of the recess C is in contact with one of the first side surfaces of the substrate 2a. In this state, the engagement portion S12a1 is in engagement with the vibrator 2 in such a manner that the vibrator 2 is capable of producing a sliding motion associated with vibrations of the vibrator 2 in the second direction D2.

The component S1a2 of the support member S1a is structurally similar to the component S1a1. More specifically, the component S1a2 includes a deformation portion S11a2, an engagement portion S12a2, and a fixed portion S13a2. The engagement portion S12a2 has a recess C defined by a flat plate part and two plate-like members. The flat plate part extends from the deformation portion S11a2, which is U-shaped. The two plate-like members are connected to the flat plate part in such a manner that the engagement portion S12a2 has a square-cornered C-shape when viewed in cross section.

The flat plate part extends beyond an edge of the deformation portion S11a2 toward the upper side on the drawing plane (i.e., toward the inner wall W5 of the housing 1). The flat plate part is twice as wide as the deformation portion S11a2. The component S1a2 of the support member S1a is mounted in the vibration motor 100F in such a manner that the inner part of the recess C is in contact with one of the first side surface of the substrate 2a. In this state, the engagement portion S12a2 is in engagement with the vibrator 2 in such a manner that the vibrator 2 is capable of (or configured for) producing a sliding motion associated with vibrations of the vibrator 2 in the second direction D2.

When viewed from above downward, the deformation portion S11a1 of the component S1a1 of the support member S1a and the deformation portion S11a2 of the component S1a2 of the support member S1a overlap each other in such a manner that the deformation portion S11a1 is closer than the deformation portion S11a2 to the upper side (the inner wall W5). The positional relationship between the components S1b1 and S1b2 of the support member S1b is the same as above.

The deformation portion S11a1 of the component S1a1 of the support member S1a and the deformation portion S11a2 of the component S1a2 of the support member S1a are U-shaped with the respective openings in opposite directions. More specifically, the deformation portion S11a1 of the component S1a1 has an opening facing the inner wall W3, and the deformation portion S11a2 of the component S1a2 has an opening facing the inner wall W4. The fixed portion S13a1 of the component S1a1 and the fixed portion S13a2 of the component S1a2 are connected to the inner wall W1 of the housing 1 in a manner so as to be mirror images of each other with respect to the symmetry axis in the first direction D1 of the substrate 2a in the state prior to vibration of the vibrator 2 in two different directions.

Similarly, the components S1b1 and S1b2 of the support member S1b have their respective deformation portions, which are U-shaped with the respective openings in opposite directions. More specifically, the deformation portion of the component S1b1 has an opening facing the inner wall W4, and the deformation portion of the component S1b2 has an opening facing the inner wall W3. The components S1b1 and S1b2 have their respective fixed portions, which are connected to the inner wall W2 of the housing 1 in a manner so as to be mirror images of each other with respect to the symmetry axis in the first direction D1 of the substrate 2a in the state prior to vibration of the vibrator 2 in two different directions.

The vibrator 2 included in the vibration motor 100F is supported by these support members. That is, the vibrator support structure of the vibration motor 100F includes the housing 1, the vibrator 2, and the support members. The vibrator 2 is slidable in the first direction D1 and the second direction D2.

As mentioned above, the stress exerted on the joint between the housing 1 and the support member S1a is reduced, and the reliability of the joint between the housing 1 and the support member S1a is increased correspondingly. Effects of such a support member may be attained by these individual support members, which are structurally different from the support member concerned and are functionally similar thereto. This configuration enables the vibration motor 100F to generate stable vibrations in two different directions, namely, in the first direction D1 and the second direction D2.

The support members S1a and S1b are each composed of two components, thus effectively eliminating or reducing deflection of vibrations when the vibrator 2 vibrates in the first direction D1.

Seventh Modification of the Vibration Motor

Figure 17:
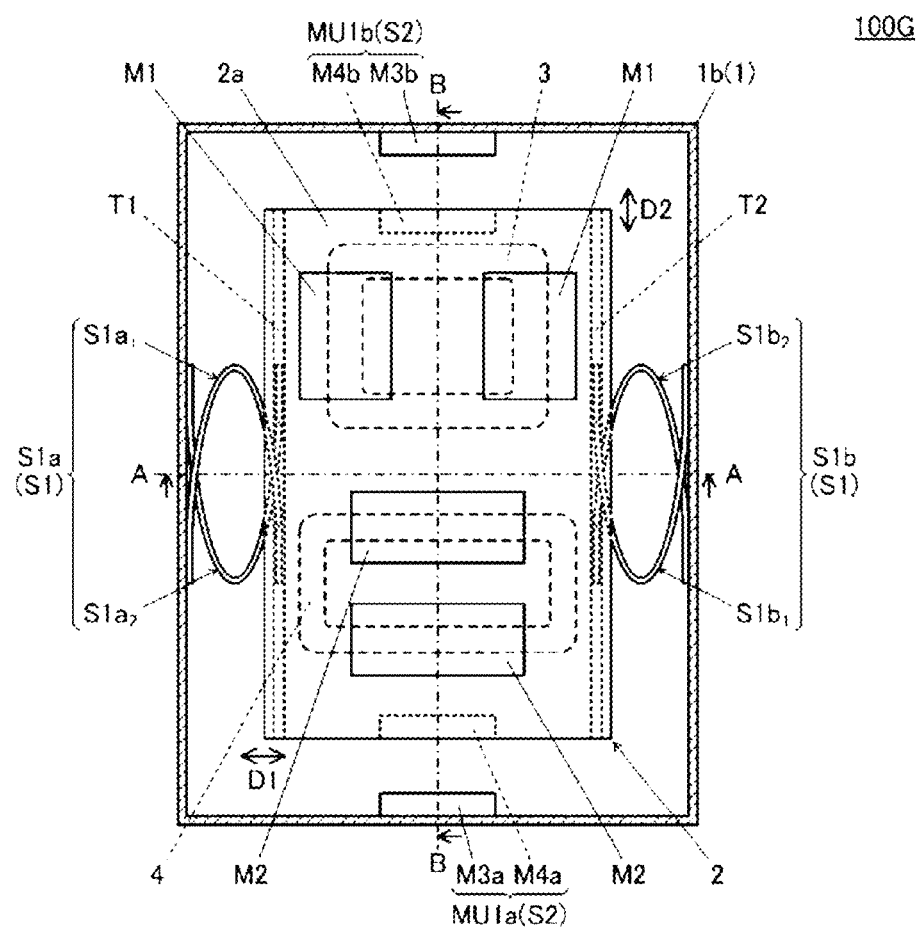
FIG. 17 is a plan view analogous to FIG. 1(A) and illustrates a vibration motor 100G, which is a seventh modification of the vibration motor 100.
Figure 18A:
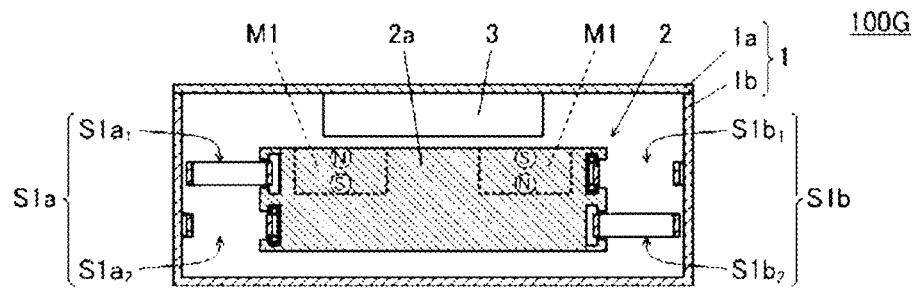
FIG. 18(A) is a sectional view analogous to FIG. 2(A) and illustrates the vibration motor 100G viewed in the direction of arrows.
Figure 18B:
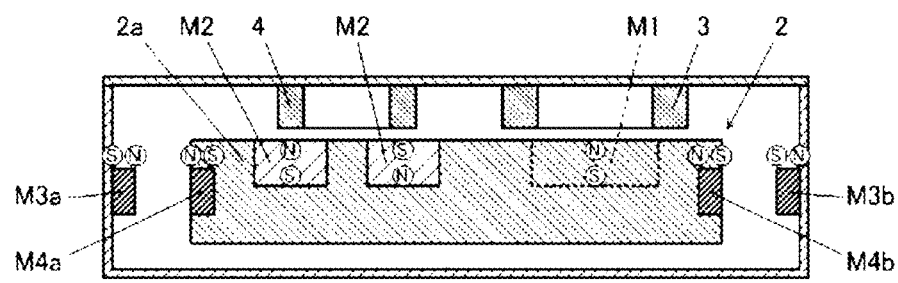
FIG. 18(B) is a sectional view analogous to FIG. 2(B) and illustrates the 100G viewed in the direction of arrows.

The following describes a vibration motor 100G with reference to FIGS. 17 and 18(A)-(B). The vibration motor 100G is a seventh modification of the vibration motor 100 according to the present disclosure.

FIG. 17 is a plan view analogous to FIG. 1(A) and illustrates the vibration motor 100G. FIG. 18(A) is a sectional view analogous to FIG. 2(A) and illustrates the vibration motor 100G viewed in the direction of arrows. FIG. 18(B) is a sectional view analogous to FIG. 2(B) and illustrates the 100G viewed in the direction of arrows. The differences between the vibration motor 100G and the vibration motor 100F are in the structure of the substrate 2a and the design of the first repulsion mechanism S1. The vibration motor 100G is otherwise similar to the vibration motor 100F and will not be described in full detail.

The thickness of the substrate 2a of the vibrator 2 included in the vibration motor 100G is twice or more than twice the width of a deformation portion S11a1, which is an elastic member in the form of a strip and will be described later. The two magnets M1 and the two magnets M2 are embedded in one of the two principal surfaces of the substrate 2a. The magnet M4a is embedded in one of the two second side surfaces of the substrate 2a, and the magnet M4b is embedded in the other second side surface of the substrate 2a.

The first side surfaces of the substrate 2a extend in the second direction D2 and each have grooves extending in the second direction D2. More specifically, one of the first side surfaces of the substrate 2a included in the vibration motor 100G has two grooves extending in the second direction D2, and the other first side surface also has two grooves extending in the second direction D2.

Openings corresponding to the four grooves are defined in the first side surfaces. Each opening is narrower than the maximum width of the corresponding groove such that the engagement portion (flat plate part) of each of the support members S1a and S1b, which will be described below, does not come off the corresponding groove.

The support member S1a included in the first repulsion mechanism S1 of the vibration motor 100G is composed of two components, which are denoted by S1a1 and S1a2, respectively. Similarly, the support member S1b included in the first repulsion mechanism S1 of the vibration motor 100G is composed of two components, which are denoted by S1b1 and S1b2, respectively. The components S1a1 and S1a2 of the support member S1a and the components S1b1 and S1b2 of the support member S1b are functionally similar to the support member S1a in the previous example and are structurally different therefrom.

The components S1a1 and S1a2 of the support member S1a included in the first repulsion mechanism S1 of the vibration motor 100G will be described below in more detail with reference to FIG. 19.

Figure 19A:
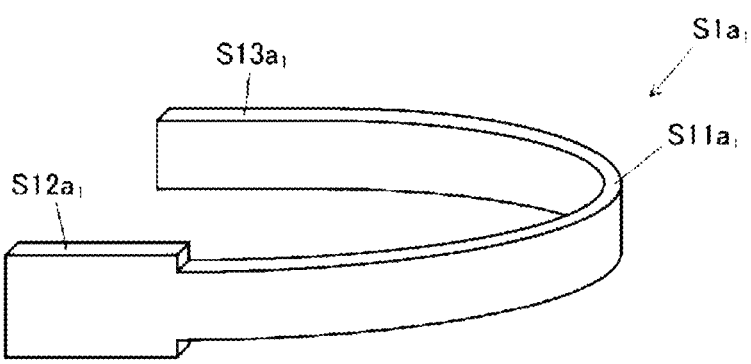
FIG. 19(A) is a perspective view of an example of S1a1, which is one of two components of the support member S1a included in the first repulsion mechanism S1 of the vibration motor 100G
Figure 19B:
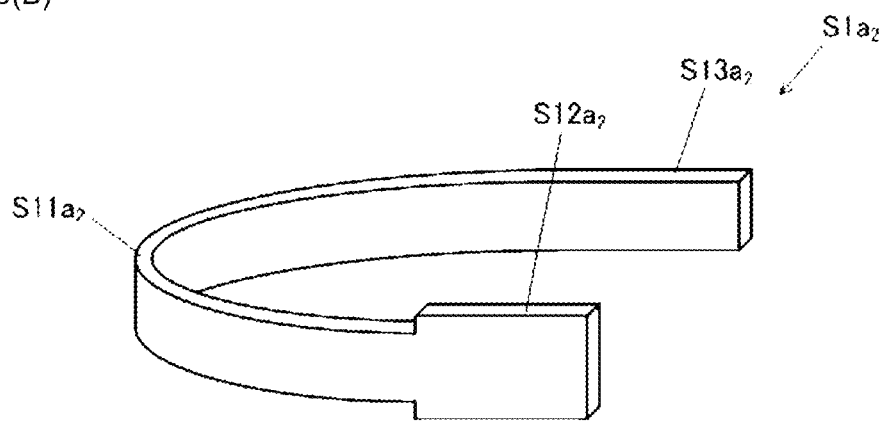

FIG. 19(A) is a perspective view of S1a1, which is one of two components of the support member S1a included in the first repulsion mechanism S1 of the vibration motor 100G. FIG. 19(B) is a perspective view of an example of S1a2, which is the other component of the support member S1a. The components S1b1 and S1b2 of the support member S1b are structurally and functionally similar to the components S1a1 and S1a2 of the support member S1a and will not be described in full detail.

The component S1a1 of the support member S1a includes a deformation portion S11a1, an engagement portion S12a1, and a fixed portion S13a1. The deformation portion S11a1 and the fixed portion S13a1 are similar to the deformation portion S11a and the fixed portion S13a, respectively, of the support member S1a in the previous example. The engagement portion S12a1 is a plat plate part extending from the deformation portion S11a1, which is U-shaped. The engagement portion S12a1 is wider than the deformation portion S11a1.

The flat plate part extends beyond edges of the deformation portion S11a1 toward the upper and lower sides on the drawing plane. The component S1a1 of the support member S1a is mounted in the vibration motor 100G in such a manner that the inner part of the upper one of the two grooves in one of the first side surfaces of the substrate 2a is in contact with the flat plate part that is the engagement portion S12a1. In this state, the engagement portion S12a1 is in engagement with the vibrator 2 in such a manner that the vibrator 2 is capable of producing a sliding motion associated with vibrations of the vibrator 2 in the second direction D2.

The component S1a2 of the support member S1a is structurally similar to the component S1a1. More specifically, the component S1a2 includes a deformation portion S11a2, an engagement portion S12a2, and a fixed portion S13a2. The engagement portion S12a2 is a plat plate part extending from the deformation portion S11a2, which is U-shaped. The engagement portion S12a2 extends beyond edges of the deformation portion S11a2 toward the upper and lower sides on the drawing plane.

The component S1a2 of the support member S1a is mounted in the vibration motor 100G in such a manner that the inner part of the lower one of the two grooves in the aforementioned first side surface of the substrate 2a is in contact with the flat plate part that is the engagement portion S12a2. In this state, the engagement portion S12a2 is in engagement with the vibrator 2 in such a manner that the vibrator 2 is capable of producing a sliding motion associated with vibrations of the vibrator 2 in the second direction D2.

When viewed from above downward, the deformation portion S11a1 of the component S1a1 of the support member S1a and the deformation portion S11a2 of the component S1a2 of the support member S1a overlap each other in such a manner that the deformation portion S11a1 is closer than the deformation portion S11a2 to the upper side (the inner wall W5). The positional relationship between the components S1b1 and S1b2 of the support member S1b is the same as above.

The deformation portion S11a1 of the component S1a1 of the support member S1a and the deformation portion S11a2 of the component S1a2 of the support member S1a are U-shaped with the respective openings in opposite directions. More specifically, the deformation portion S11a1 of the component S1a1 has an opening facing the inner wall W3, and the deformation portion S11a2 of the component S1a2 has an opening facing the inner wall W4. The fixed portion S13a1 of the component S1a1 and the fixed portion S13a2 of the component S1a2 are connected to the inner wall W1 of the housing 1 in a manner so as to be mirror images of each other with respect to the symmetry axis in the first direction D1 of the substrate 2a in the state prior to vibration of the vibrator 2 in two different directions.

Similarly, the components S1b1 and S1b2 of the support member S1b have their respective deformation portions, which are denoted by S11b1 and S11b2 and are U-shaped with the respective openings in opposite directions. More specifically, the deformation portion of the component S1b1 has an opening facing the inner wall W4, and the deformation portion of the component S1b2 has an opening facing the inner wall W3. The components S1b1 and S1b2 have their respective fixed portions, which are connected to the inner wall W2 of the housing 1 in a manner so as to be mirror images of each other with respect to the symmetry axis in the first direction D1 of the substrate 2a in the state prior to vibration of the vibrator 2 in two different directions.

The vibrator 2 included in the vibration motor 100G is supported by these support members. That is, the vibrator support structure of the vibration motor 100G includes the housing 1, the vibrator 2, and the support members. The vibrator 2 is slidable in the first direction D1 and the second direction D2.

As mentioned above, the stress exerted on the joint between the housing 1 and the support member S1a is reduced, and the reliability of the joint between the housing 1 and the support member S1a is increased correspondingly. Effects of such a support member may be attained by these individual support members, which are structurally different from the support member concerned and are functionally similar thereto. This configuration enables the vibration motor 100G to generate stable vibrations in two different directions, namely, in the first direction D1 and the second direction D2.

The support members S1a and S1b are each composed of two components, thus effectively eliminating or reducing deflection of vibrations when the vibrator 2 vibrates in the first direction D1.

Eighth Modification of the Vibration Motor

Figure 20A:
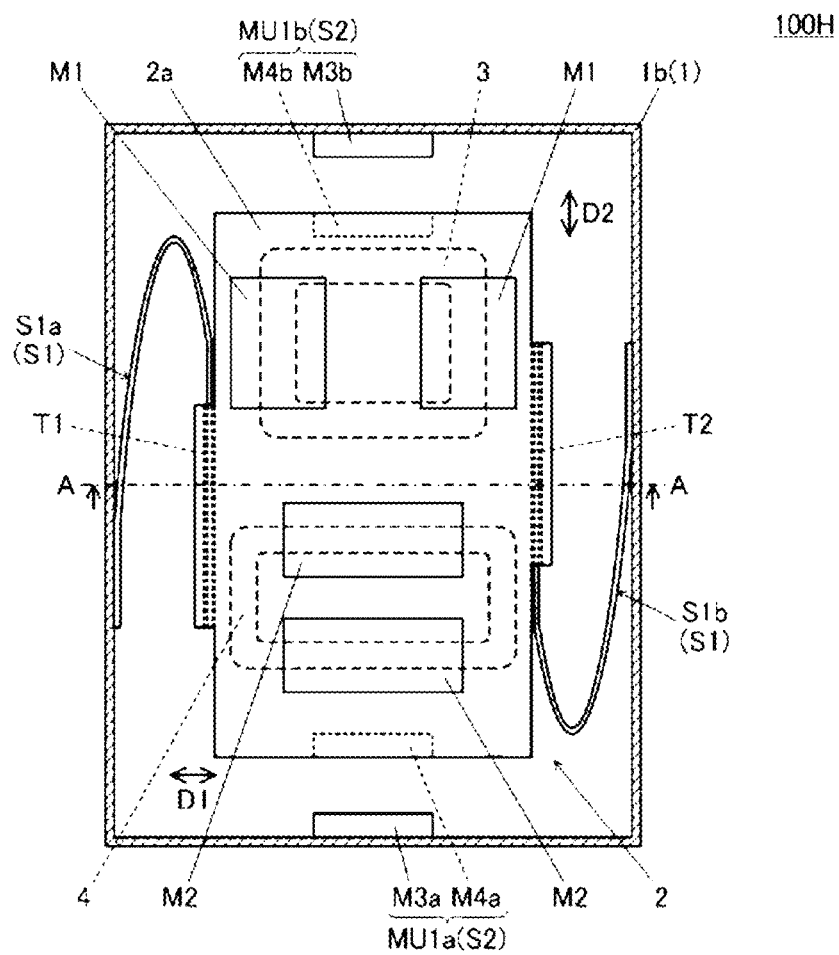
FIG. 20(A) is a plan view analogous to FIG. 1(A) and illustrates a vibration motor 100H, which is an eighth modification of the vibration motor 100.
Figure 20B:
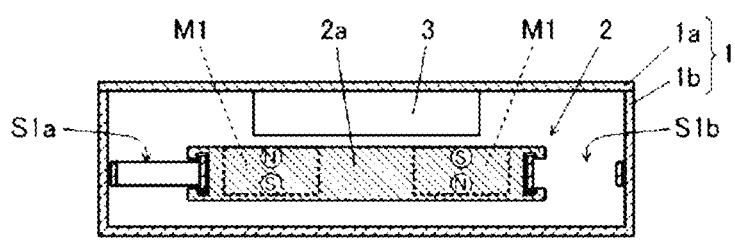
FIG. 20(B) is a sectional view analogous to FIG. 2(A) and illustrates the vibration motor 100H viewed in the direction of arrows.

The following describes a vibration motor 100H with reference to FIGS. 20(A)-(B). The vibration motor 100H is an eighth modification of the vibration motor 100 according to the present disclosure.

FIG. 20(A) is a plan view analogous to FIG. 1(A) and illustrates the vibration motor 100H. FIG. 20(B) is a sectional view analogous to FIG. 2(A) and illustrates the vibration motor 100H viewed in the direction of arrows. The differences between the vibration motor 100G and the vibration motor 100H are in the structure of the substrate 2a and the design of the first repulsion mechanism S1. The vibration motor 100H is otherwise similar to the vibration motor 100G and will not be described in full detail.

The thickness of the substrate 2a of the vibrator 2 included in the vibration motor 100H is equal to or greater than the width of a deformation portion S11a1, which is an elastic member in the form of a strip and will be described later. The two magnets M1 and the two magnets M2 are embedded in one of the two principal surfaces of the substrate 2a. The magnet M4a is embedded in one of the two second side surfaces of the substrate 2a, and the magnet M4b is embedded in the other second side surface of the substrate 2a.

The first side surfaces of the substrate 2a extend in the second direction D2 and each have a groove extending in the second direction D2. More specifically, one of the first side surfaces of the substrate 2a included in the vibration motor 100H has a groove extending in the second direction D2, and the other first side surface also has a groove extending in the second direction D2.

The first repulsion mechanism S1 of the vibration motor 100H includes a support member S1a and a support member S1b. The support member S1a is structurally similar to the component S1a1 of the support member S1a included in the vibration motor 100G The support member S1b is structurally similar to the component S1b1 of the support member S1b included in the vibration motor 100G These support members are functionally similar to the component S1a1 of the support member S1a and the component S1b1 of the support member S1b, respectively. That is, these support members are functionally similar to the support member S1a included in the vibration motor 100.

Openings corresponding to the two grooves are defined in the first side surfaces. Each opening is narrower than the maximum width of the corresponding groove such that the engagement portion of each of the support members S1a and S1b does not come off the corresponding groove.

The support member S1a is mounted in the vibration motor 100H in such a manner that the inner part of the groove in one of the first side surfaces of the substrate 2a is in contact with the flat plate part that is the engagement portion of the support member S1a. In this state, the engagement portion of the support member S1a is in engagement with the vibrator 2 in such a manner that the vibrator 2 is capable of producing a sliding motion associated with vibrations of the vibrator 2 in the second direction D2.

The support member S1b is mounted in the vibration motor 100H in such a manner that the inner part of the groove in the other first side surface of the substrate 2a is in contact with the flat plate part that is the engagement portion of the support member S1b. In this state, the engagement portion of the support member S1b is in engagement with the vibrator 2 in such a manner that the vibrator 2 is capable of (or configured for) producing a sliding motion associated with vibrations of the vibrator 2 in the second direction D2.

The vibrator 2 included in the vibration motor 100H is supported by these support members. That is, the vibrator support structure of the vibration motor 100H includes the housing 1, the vibrator 2, and the support members. The vibrator 2 is slidable in the first direction D1 and the second direction D2.

As mentioned above, the stress exerted on the joint between the housing 1 and the support member S1a is reduced, and the reliability of the joint between the housing 1 and the support member S1a is increased correspondingly. Effects of such a support member may be attained by these individual support members, which are structurally different from the support member concerned and are functionally similar thereto. This configuration enables the vibration motor 100H to generate stable vibrations in two different directions, namely, in the first direction D1 and the second direction D2.

Exemplary Embodiment of Vibration Motor

The following describes a vibration motor 200 with reference to FIGS. 21(A)-(B) and 22(A)-(B). The vibration motor 200 is an embodiment of a vibration motor including the vibrator support structure according to the present disclosure.

Figure 21A:
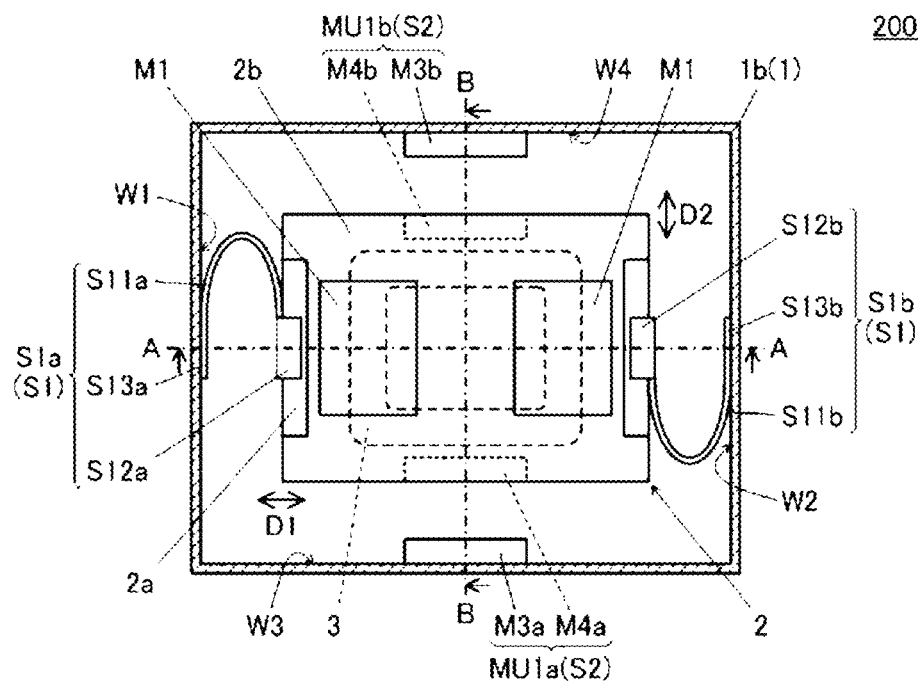
FIG. 21(A) is a plan view of a vibration motor 200, which is an embodiment of the vibration motor including the vibrator support structure according to the present disclosure, and more specifically.
Figure 21B:
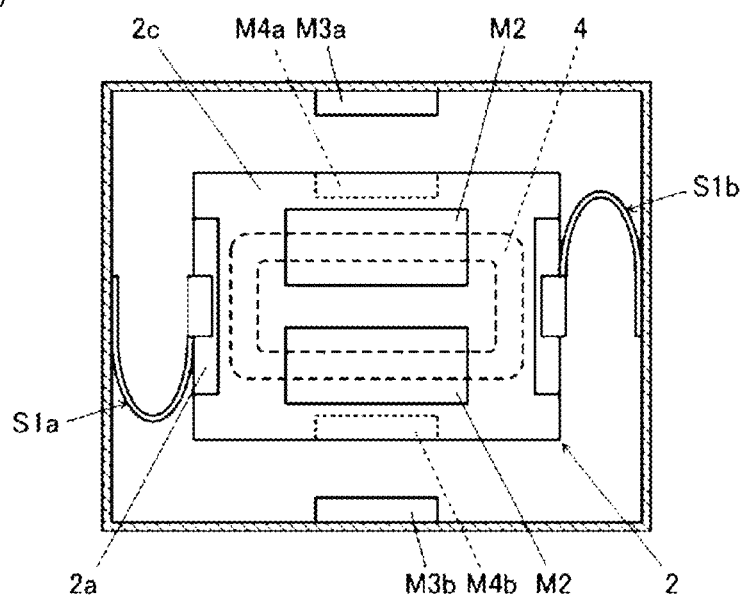
FIG. 21(B) is a plan view of the vibration motor 200, illustrating the vibration motor 200 viewed from below upward in a state in which the second portion 1b of the housing 1 is cut away.
Figure 22A:
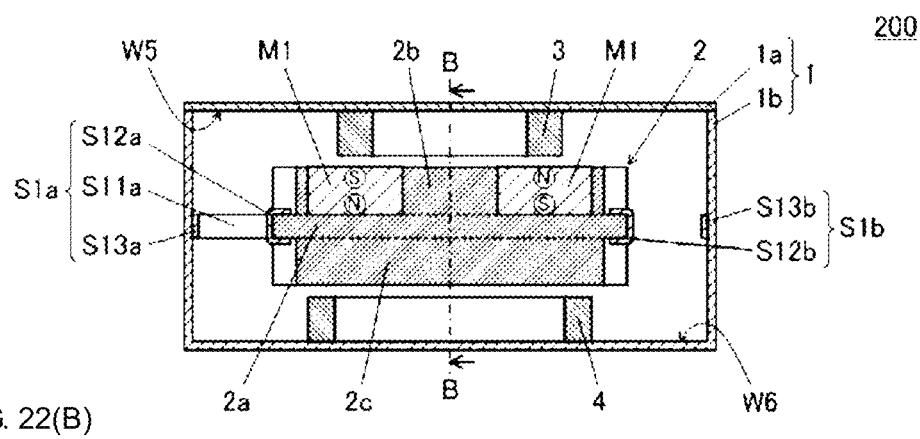
FIG. 22(A) is a sectional view of the vibration motor 200 taken along line A-A in FIG. 21(A), illustrating the vibration motor 200 viewed in the direction of arrows.
Figure 22B:
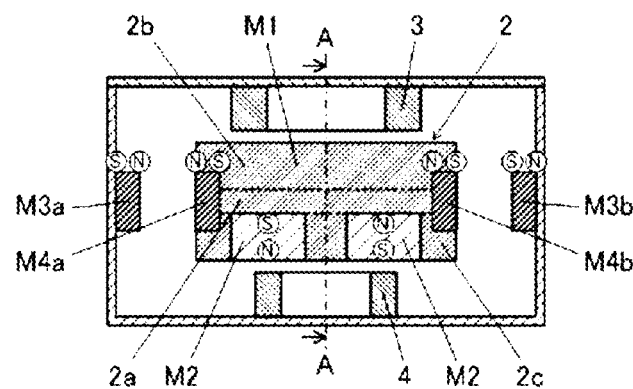
FIG. 22(B) is a sectional view of the vibration motor 200 taken along line B-B in FIG. 21(A), illustrating the vibration motor 200 viewed in the direction of arrows.

FIG. 21(A) is a plan view of the vibration motor 200, illustrating the vibration motor 200 viewed from above downward in a state in which the first portion 1a (see FIG. 2) of the housing 1 is cut away. FIG. 21(B) is a plan view of the vibration motor 200, illustrating the vibration motor 200 viewed from below upward in a state in which a section that is part of the second portion 1b (see FIG. 2) of the housing 1 and faces the first portion 1a is cut away. FIG. 22(A) is a sectional view of the vibration motor 200 taken along line A-A in FIG. 21(A), illustrating the vibration motor 200 viewed in the direction of arrows. FIG. 22(B) is a sectional view of the vibration motor 200 taken along line B-B in FIG. 21(A), illustrating the vibration motor 200 viewed in the direction of arrows.

Referring to FIGS. 21(A)-(B) and 22(A)-(B), the vibration motor 200 includes a housing 1 (first housing), a vibrator 2, a coil 3 (first coil), a coil 4 (second coil), a first repulsion mechanism S1, and a second repulsion mechanism S2. The vibrator 2 includes two magnets M1 (first magnets), two magnets M2 (second magnets), a substrate 2a, a weighting portion 2b, and a weighting portion 2c.

The first repulsion mechanism S1 includes a support member S1a and a support member S1b (first support members), by which the vibrator 2 is supported within the housing 1. The support members S1a and S1b are identical to the ones described above in relation to the vibration motor 100. The second repulsion mechanism S2 includes a magnet unit MU1a (first magnet unit) and a magnet unit MU1b (first magnet unit). The magnet units MU1a and MU1b are identical to the ones described above in relation to the vibration motor 100A. The magnet unit MU1a includes a magnet M3a (third magnet) and a magnet M4a (fourth magnet). The magnet unit MU1b includes a magnet M3b (third magnet) and a magnet M4b (fourth magnet).

That is, the basic structure of the vibration motor 200 is identical to the basic structure of the vibration motor 100A, and the vibrator 2 additionally includes the weighting portions 2b and 2c. The substrate 2a doubles as a weighting portion. The weighting portions 2b and 2c double as a substrate. The weighting portion 2b is disposed on one of the principal surfaces of the substrate 2a; that is, the weighting portion 2b is close to the inner wall W5. The weighting portion 2c is disposed on the other principal surface of the substrate 2a; that is, the weighting portion 2c is close to the inner wall W6.

The housing 1 includes a first portion 1a and a second portion 1b. The first portion 1a of the housing 1 of the vibration motor 200 is a lid in the form of a flat plate, and the second portion 1b of the housing 1 of the vibration motor 200 is a receptacle. The housing 1 may, for example, be made of stainless steel, such as SUS 304. The first portion 1a and the second portion 1b may be made of different materials.

As in the vibration motor 100A, the magnets M1 and the magnets M2 act as driving magnets, and the magnets M3a and M3b and the magnets M4a and M4b constitute magnetic mechanisms. Each magnet may be a rare-earth magnet mainly made of neodymium, iron, and boron (i.e., Nd—Fe—B magnet) or a rare-earth magnet mainly made of samarium and cobalt (i.e., Sm—Co magnet) according to exemplary aspects.

The rare-earth magnets preferred as the magnets M1 and the magnets M2 are Nd—Fe—B magnets, which have strong magnetic force and can thus provide a greater driving force to the vibrator 2. The rare-earth magnet preferred as the magnets constituting the magnetic mechanisms are Sm—Co magnets, the magnetic force of which is less susceptible to temperature variations such that these magnets can stably produce the effects of magnetic springs. The layout of the magnets included in the vibration motor 200 is the same as the layout of the magnets included in the vibration motor 100A and will not be further elaborated here.

The substrate 2a and the weighting portions 2b and 2c may be made of tungsten (W), stainless steel such as SUS 304, or aluminum (Al), for example. An increase in the mass of the vibrator 2 is conducive to transmission of strong vibrations to the housing 1 through the magnetic mechanisms. For this reason, the substrate 2a and the weighting portions 2b and 2c are preferably made of, for example, tungsten (W), which is a substance of high specific gravity.

The weighting portion 2b has through-holes, which are slots in which the two magnets M1 fit. The weighting portion 2b also has recesses (see FIG. 22(A)), where the substrate 2a is exposed such that the engagement portion S12a of the support member S1a and the engagement portion S12b of the support member S1b are slidably engaged with the substrate 2a.

The weighting portion 2c has through-holes, which are slots in which the two magnets M2 fit. The weighting portion 2c also has recesses (see FIG. 22(A)), where the substrate 2a is exposed such that the engagement portion S12a of the support member S1a and the engagement portion S12b of the support member S1b are slidably engaged with the substrate 2a.

The substrate 2a and the weighting portions 2b and 2c each have recesses. With the substrate 2a and the weighting portions 2b and 2c being combined into one, these recesses constitute slots, in which the magnets M4a and M4b fit. It is not required that each of the slots in which the magnets M1 and the magnets M2 fit be a through-hole extending through the corresponding weighting portion.

These slots are arranged in such a manner that the positional relationship between the coil 3 and the magnets M1, the positional relationship between the coil 4 and the magnets M2, the positional relationship between the magnet M3a and the magnet M4a, and the positional relationship between the magnet M3b and the magnet M4b are identical to the respective positional relationships described in relation to the vibration motor 100A. Each magnet is inserted in the corresponding slot and is fixed with, for example, an epoxy adhesive.

The slots into which the magnets are inserted provide ease of fixing the magnets to the substrate 2a and the weighting portions 2b and 2c. Furthermore, the magnets are fixed to the substrate 2a and the weighting portions 2b and 2c with high accuracy.

The vibrator 2 is produced in the following manner. The two magnets M1 are fixed to the respective slots in the weighting portion 2b, and the two magnets M2 are fixed to the respective slots in the weighting portion 2c. The substrate 2a, the weighting portion 2b, and the weighting portion 2c are then bonded together, whereby additional slots are formed. Subsequently, the magnets M4a and M4b are fixed to the additional slots. Alternatively, the vibrator 2 may be produced by fixing the magnets to a one-piece body including the substrate 2a and the weighting portions 2b and 2c.

The coil 3 may, for example, be made of about 100 winding turns of a coated copper (Cu) wire measuring 0.06 mm in diameter. The number of winding turns may be adjusted in accordance with the required driving force. The coil 3 is connected to a regulated power supply with a power amplifier disposed therebetween. The connection between the coil 3 and the regulated power supply is formed by an extended wiring member such as a flexible substrate. The extended wiring member, the regulated power supply, and the power amplifier are not illustrated in the drawings. The coil 3 provides driving force to the magnets M1 in such a way as to enable the vibrator 2 to vibrate in the first direction D1. The placement and shape of the coil 3 are as described in relation to the vibration motor 100A and will not be further elaborated here.

The coil 4 may, for example, be made of about 80 winding turns of a coated copper (Cu) wire measuring 0.06 mm in diameter. The number of winding turns may be adjusted in accordance with the required driving force. The coil 4 is connected to a regulated power supply with a power amplifier disposed therebetween. The connection between the coil 4 and the regulated power supply is formed by an extended wiring member such as a flexible substrate. The extended wiring member, the regulated power supply, and the power amplifier are not illustrated in the drawings. The coil 4 provides driving force to the magnets M2 in such a way as to enable the vibrator 2 to vibrate in the second direction D2. The placement and shape of the coil 4 are as described in relation to the vibration motor 100A and will not be further elaborated here.

The first repulsion mechanism S1 of the vibration motor 200 includes the aforementioned support members S1a and S1b, whereas the second repulsion mechanism S2 of the vibration motor 200 does not include the support members by which the vibrator 2 is supported within the housing 1. That is, the vibrator support structure of the vibration motor 200 includes the housing 1, the vibrator 2, and the support members S1a and S1b. The vibrator 2 is slidable in the first direction D1 and the second direction D2.

When the vibrator 2 included in the vibration motor 100A vibrates in the second direction D2, the stress exerted on the joint between the housing 1 and the support member S1a and on the joint between the housing 1 and the support member S1b is reduced accordingly. This configuration enables the vibration motor 100A to generate stable vibrations in two different directions, namely, in the first direction D1 and the second direction D2.

The exemplary embodiments above are not the only embodiments of the vibration motor. For example, any one of the aforementioned embodiments and aspects of the vibration motor may be implemented as an embodiment of the vibration motor.

Exemplary Embodiment of Electronic Device

Figure 23:
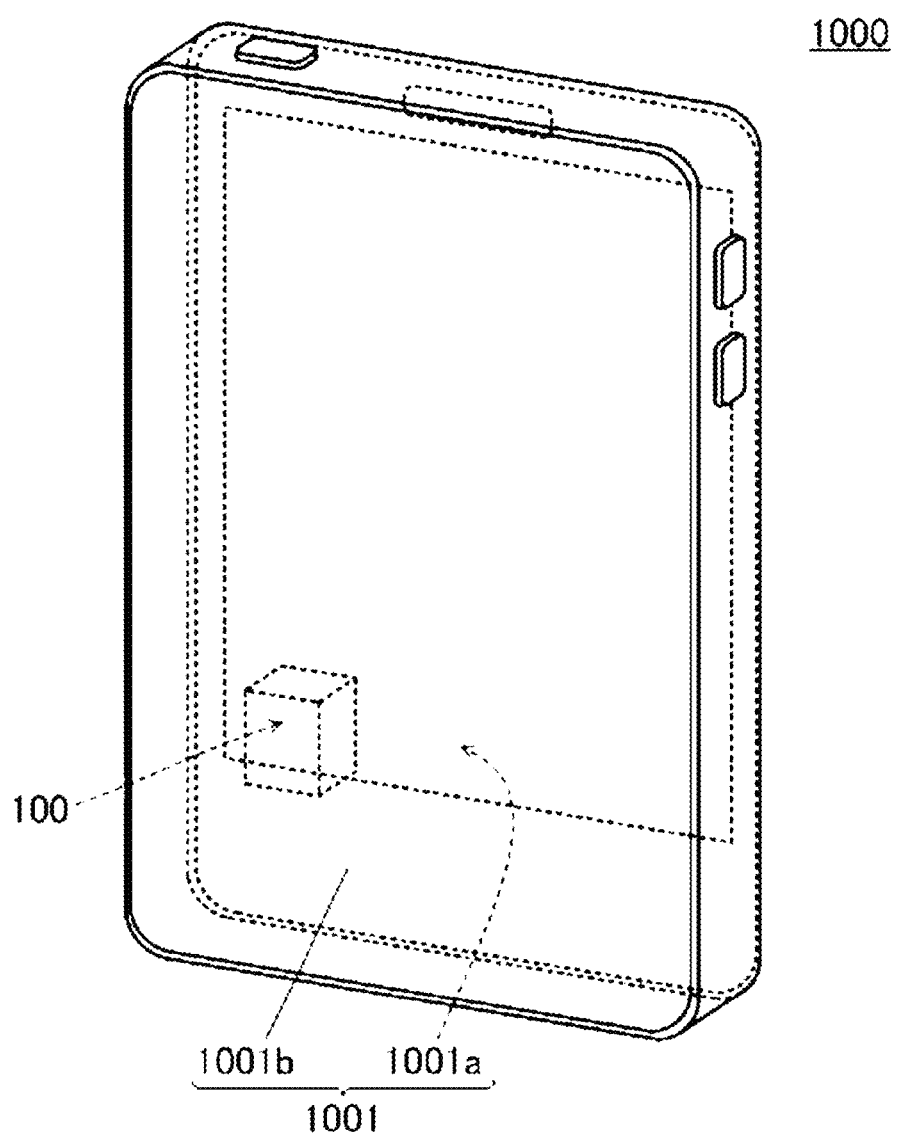
FIG. 23 is a see-through perspective view of a mobile information terminal 1000, which is an electronic device according to the present disclosure.
Figure 24:
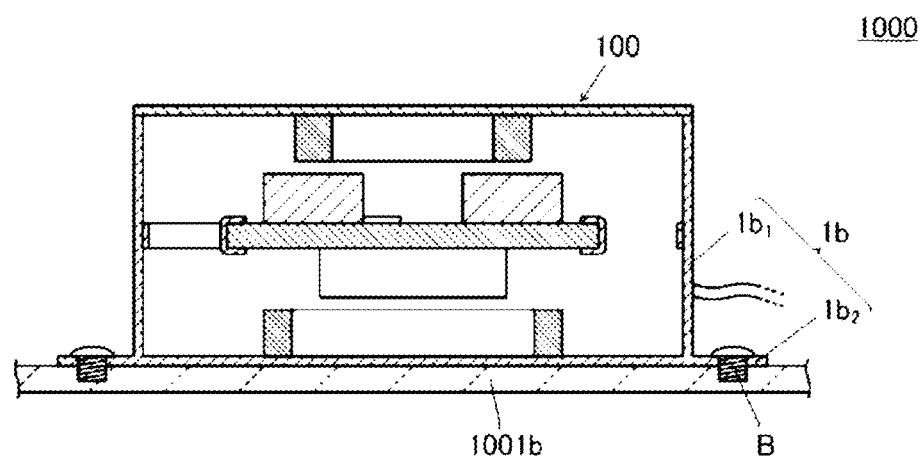
FIG. 24 is a sectional view of a principal part of the mobile information terminal 1000.
Figure 25:
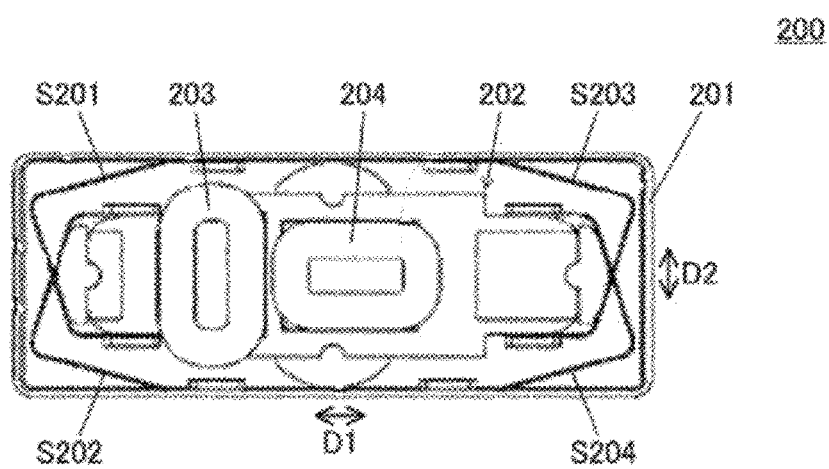
FIG. 25 is a sectional view of a vibration motor 200 known in the art.

The following describes a mobile information terminal 1000 with reference to FIGS. 23 and 24. The mobile information terminal 1000 is an electronic device including the vibration motor according to the present disclosure.

FIG. 23 is a see-through perspective view of the mobile information terminal 1000. FIG. 24 is a sectional view of a principal part of the mobile information terminal 1000.

The mobile information terminal 1000 includes a housing 1001 (second housing), the vibration motor 100 according to the present disclosure, and electronic circuitry (not illustrated) for transmission, reception, and information processing. The housing 1001 includes a first portion 1001a and a second portion 1001b. The first portion 1001a is a display, and the second portion 1001b is a frame. The vibration motor 100 is accommodated in the housing 1001.

The vibration motor 100 according to the present disclosure is included in the mobile information terminal 1000 to act as a vibration generator that vibrates to provide cutaneous sensation feedback, to indicate the touch of a key, or to notify the user of an incoming call or message. The vibration motor to be included in the mobile information terminal 1000 is not limited to the vibration motor 100; that is, any vibration motor according to the present disclosure may be included in the mobile information terminal 1000.

As described above, the vibration motor according to the present disclosure ensures a high degree of reliability of the joints between the housing and the support members by which the vibrator is supported within the housing, and the vibration motor is thus capable of generating stable vibrations in two different directions. These features enable the mobile information terminal 1000 to reduce attenuation of vibrations providing cutaneous sensation feedback, indicating the touch of a key, or notifying the user of an incoming call or message.

As illustrated in FIG. 24, the second portion 1b of the housing 1 of the vibration motor 100 includes the receptacle main body 1b1 and the fixed section 1b2. The fixed section 1b2 is an overhang extending from the bottom of the receptacle main body 1b1. The fixed section 1b2 is fastened to the second portion 1001b of the housing 1001 of the mobile information terminal 1000 with screws B.

The support members included in the vibration motor 100 are fixed to the inner walls W1 to W4 of the housing 1 (see FIG. 1), that is, to inner sides of side walls of the receptacle main body 1b1. As described above, vibrations of the vibrator 2 included in the vibration motor 100 are transmitted through the support members, thus causing the housing 1 to vibrate. Vibrations of the housing 1 cause the housing 1001 to vibrate. These vibrations enable the user of mobile information terminal 1000 to get cutaneous sensation feedback and a sense of touching a key and to be notified of an incoming call or message.

The vibration motor 100 may be installed in such a manner that the fixed section 1b2 is fixed to the first portion 1001a of the housing 1001, that is, to the display.

Such a mobile information terminal including a display is merely an example of the electronic device including the vibration motor according to the present disclosure. It is not required that a display be included in the electronic device according to the present disclosure.

Examples of the electronic device according to the present disclosure include mobiles phones (feature phones), smartphones, portable game consoles, controllers used to operate video game consoles, controllers used to operate virtual reality (VR) devices, smart watches, tablet PCs, notebook PCs, remote controllers used to operate TVs, touch panel displays of automatic teller machines, and various types of toys.

Embodiments in the present disclosure are illustrative, and the present invention is not limited to the embodiments and modifications described above. It should be noted that various applications and alterations are possible within the scope of the present invention.

The present invention is applicable to a vibration motor included in an electronic device in such a way as to act as a vibration generator that vibrates to provide cutaneous sensation feedback, to indicate the touch of a key, or to notify the user of an incoming call or message. The cutaneous sensation feedback may, for example, be in the form of vibrations of a controller held by a video game player. The vibrations provide a tactile sense associated with the player's action in a video game, such as opening or closing a door or getting behind the wheel of a car. The cutaneous sensation feedback is not limited to the above.

The present invention is also applicable to a linear vibration motor that finds use as an actuator of a robot.

REFERENCE SIGNS LIST 100 vibration motor
1 housing (first housing)
2 vibrator
3 coil (first coil)
4 coil (second coil)
M1 magnet (first magnet)
M2 magnet (second magnet)
S1 first repulsion mechanism
S1a, S1b support member (first support member)
S11a, S11b deformation portion
S12a, S12b engagement portion
S2 second repulsion mechanism
S2a, S2b support member (second support member)
S21a, S21b deformation portion
S22a, S22b engagement portion
D1 first direction
D2 second direction

The invention claimed is:

1. A vibrator support structure, comprising:
a housing;
a vibrator configured to vibrate in a first direction and a second direction that crosses the first direction; and
at least one first support member that supports the vibrator within the housing and includes:
a first deformation portion configured to undergo an elastic deformation in response to vibrations of the vibrator in the first direction, and
a first engagement portion that is engaged with the vibrator in such a manner that the vibrator is configured to produce a sliding motion associated with the vibrations of the vibrator in the second direction.

2. The vibrator support structure according to claim 1, wherein the vibrator includes a substrate having a first side surface extending in the second direction, the first engagement portion has a recess, and the first side surface is in contact with an inner part of the recess of the first engagement portion.

3. The vibrator support structure according to claim 1, wherein the vibrator includes a substrate that has a first side surface extending in the second direction and a groove disposed in the first surface that extends in the second direction, and the first engagement portion includes a flat plate that is in contact with an inner part of the groove.

4. The vibrator support structure according to claim 1, further comprising:
at least one second support member that supports the vibrator within the housing, wherein the second support member includes:
a second deformation portion configured to undergo an elastic deformation in response to vibrations of the vibrator in the second direction, and
a second engagement portion that is engaged with the vibrator in such a manner that the vibrator is configured to produce a sliding motion associated with the vibrations of the vibrator in the first direction.

5. The vibrator support structure according to claim 4, wherein the vibrator includes a substrate with a first side surface extending in the second direction and a second side surface extending in the first direction,
wherein the second engagement portion has a recess, and
wherein the second side surface is in contact with an inner part of the recess of the second engagement portion.

6. The vibrator support structure according to claim 1, wherein the first direction is orthogonal to the second direction.

7. An electronic device, comprising:
the vibration motor according to claim 1; and
an additional housing that accommodates the vibration motor.

8. A vibration motor, comprising
a housing;
a vibrator including at least one first magnet and at least one second magnet;
a first coil fixed to the housing to provide a driving force to the at least one first magnet such that the driving force causes the vibrator to vibrate in a first direction;

a second coil fixed to the housing to provide a driving force to the at least one second magnet such that the driving force causes the vibrator to vibrate in a second direction that crosses the first direction;

a first repulsion mechanism that causes repulsion between the housing and the vibrator in the first direction and configures the vibrator to move in the second direction; and a second repulsion mechanism that causes repulsion between the housing and the vibrator in the second direction and configures the vibrator to move in the first direction, wherein the first repulsion mechanism includes a first support member that supports the vibrator within the housing and includes:

a first deformation portion configured to undergo an elastic deformation in response to vibrations of the vibrator in the first direction, and a first engagement portion that is engaged with the vibrator such that the vibrator is configured to produce a sliding motion associated with vibrations of the vibrator in the second direction.

9. The vibration motor according to claim 8, wherein the second repulsion mechanism includes a second support member that supports the vibrator within the housing and includes:

a second deformation portion configured to undergo an elastic deformation in response to vibrations of the vibrator in the second direction, and a second engagement portion that is engaged with the vibrator such that the vibrator is configured to produce a sliding motion associated with vibrations of the vibrator in the first direction.

10. The vibration motor according to claim 8, wherein the second repulsion mechanism includes at least one first magnet unit that causes repulsion between the housing and the vibrator in the second direction.

11. The vibration motor according to claim 10, wherein the first magnet unit includes:

a third magnet fixed to the housing, and a fourth magnet mounted on the vibrator such that the third and fourth magnets repel each other in the second direction.

12. The vibration motor according to claim 10, wherein the first magnet unit includes:

a fifth magnet fixed to the housing, and a sixth magnet and a seventh magnet that are aligned in the second direction with the fifth magnet therebetween and that are mounted on the vibrator such that the fifth and sixth magnets repel each other in the second direction and the fifth and seventh magnets repel each other in the second direction.

13. The vibration motor according to claim 8, wherein the first repulsion mechanism includes the first support member and at least one second magnet unit that causes repulsion between the housing and the vibrator in the first direction.

14. The vibration motor according to claim 13, wherein the second magnet unit includes:

an eighth magnet fixed to the housing, and a ninth magnet mounted on the vibrator such that the eighth and ninth magnets repel each other in the first direction.

15. The vibrator moto according to claim 8, wherein the first direction is orthogonal to the second direction.

16. A vibrator support structure, comprising:

a housing;

a vibrator disposed in the housing configured to vibrate in a first direction and a second direction that is orthogonal to the first direction; and at least one first support coupling the vibrator to the housing, with the at least one support including a first elastic deformable member disposed between the vibrator and a first wall of the housing, and a first engagement member that couples the first elastic deformable member to the vibrator, such that the vibrator produces a sliding motion in response to a vibration of the vibrator in the second direction.

17. The vibrator support structure according to claim 16, wherein the vibrator includes a substrate having a first side surface extending in the second direction, the first engagement member has a recess, and the first side surface contacts an inner part of the recess of the first engagement member.

18. The vibrator support structure according to claim 16, wherein the vibrator includes a substrate that has a first side surface extending in the second direction and a groove disposed in the first surface that extends in the second direction, and the first engagement member includes a flat plate that contacts an inner part of the groove.

19. The vibrator support structure according to claim 16, further comprising:

at least one second support that supports the vibrator within the housing and includes:

a second elastic deformable member disposed between the vibrator and a second wall of the housing that is opposite the first wall, and a second engagement member that couples the second elastic deformable member to the vibrator, such that the vibrator produces a sliding motion in response to the vibration of the vibrator in the first direction.

20. The vibrator support structure according to claim 19, wherein the vibrator includes a substrate with a first side surface extending in the second direction and a second side surface extending in the first direction, wherein the second engagement member has a recess, and wherein the second side surface is in contact with an inner part of the recess of the second engagement member.

* * * * *